(12) United States Patent
Hwang et al.

(10) Patent No.: US 9,916,865 B2
(45) Date of Patent: Mar. 13, 2018

(54) MOBILE TERMINAL AND CONTROLLING METHOD THEREOF

(71) Applicant: LG ELECTRONICS INC., Seoul (KR)

(72) Inventors: Dohyun Hwang, Seoul (KR); Hosoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 14/694,726

(22) Filed: Apr. 23, 2015

(65) Prior Publication Data

US 2015/0268804 A1 Sep. 24, 2015

Related U.S. Application Data

(63) Continuation of application No. 13/763,871, filed on Feb. 11, 2013, now Pat. No. 9,442,629.

(30) Foreign Application Priority Data

Feb. 24, 2012 (KR) .................. 10-2012-0018982

(51) Int. Cl.
*G06F 3/0482* (2013.01)
*G11B 27/10* (2006.01)
(Continued)

(52) U.S. Cl.
CPC ............ *G11B 27/102* (2013.01); *G06F 3/048* (2013.01); *G06F 3/0482* (2013.01); *G06F 3/0485* (2013.01); *G06F 3/0488* (2013.01); *G06F 3/04842* (2013.01); *G06F 3/04847* (2013.01); *G06F 3/04883* (2013.01); *G06F 17/30849* (2013.01); *G06T 1/20* (2013.01);
(Continued)

(58) Field of Classification Search
CPC .. G06F 3/0482; G06F 3/04842; G06F 3/0488; G06F 3/04883; G06T 1/20
See application file for complete search history.

(56) References Cited

U.S. PATENT DOCUMENTS 6,384,846 B1 5/2002 Hiroi
7,965,918 B2 6/2011 Kim
(Continued)

FOREIGN PATENT DOCUMENTS

CN 101681225 A 3/2010
CN 102754062 A 10/2012
(Continued)

*Primary Examiner* — Andrey Belousov
*Assistant Examiner* — Seth A Silverman
(74) *Attorney, Agent, or Firm* — Birch, Stewart, Kolasch & Birch, LLP

(57) ABSTRACT

A mobile terminal including a touchscreen; and a controller configured to display a video list in a first region of the touchscreen, display a selected video from the video list in a second region of the touch screen different than the first region, in response to a first type of input for selecting the video, and display the selected video in the first region of the touch screen, in response to a second type of input for selecting the video different than the first type of touch input. Further, the first type of input corresponds to a direct touch input to the touchscreen, and the second type of input corresponds to a proximity touch input to the touchscreen.

13 Claims, 18 Drawing Sheets

(51) Int. Cl.
    *G06F 3/0485*    (2013.01)
    *G06F 3/0488*    (2013.01)
    *G06F 3/048*     (2013.01)
    *G11B 27/34*     (2006.01)
    *G06F 3/0484*    (2013.01)
    *G06T 1/20*      (2006.01)
    *G06F 17/30*     (2006.01)
    *H04N 7/14*      (2006.01)

(52) U.S. Cl.
    CPC ............ *G11B 27/105* (2013.01); *G11B 27/34* (2013.01); *H04N 2007/145* (2013.01)

(56) References Cited

U.S. PATENT DOCUMENTS

| | | | |
|---|---|---|---|
| 2004/0095396 A1* | 5/2004 | Stavely | G06F 3/04817 715/838 |
| 2004/0197078 A1 | 10/2004 | Yoon et al. | |
| 2006/0267995 A1 | 11/2006 | Radloff et al. | |
| 2007/0016611 A1* | 1/2007 | Wang | G11B 27/34 |
| 2007/0024752 A1* | 2/2007 | Roush | H04N 5/45 348/565 |
| 2008/0065722 A1* | 3/2008 | Brodersen | G06F 3/0236 709/203 |
| 2008/0253737 A1 | 10/2008 | Kimura et al. | |
| 2009/0228919 A1 | 9/2009 | Zott et al. | |
| 2009/0310933 A1 | 12/2009 | Lee | |
| 2010/0082585 A1 | 4/2010 | Barsook et al. | |
| 2010/0083115 A1 | 4/2010 | Park | |
| 2010/0278509 A1 | 11/2010 | Nagano et al. | |
| 2010/0303440 A1* | 12/2010 | Lin | H04N 5/76 386/241 |
| 2011/0157046 A1 | 6/2011 | Lee et al. | |
| 2011/0161818 A1 | 6/2011 | Viljamaa | |
| 2011/0163969 A1* | 7/2011 | Anzures | G06F 3/04883 345/173 |
| 2011/0170749 A1 | 7/2011 | Schneiderman et al. | |
| 2011/0239155 A1 | 9/2011 | Christie | |
| 2012/0068941 A1 | 3/2012 | Arrasvuori et al. | |
| 2012/0166950 A1 | 6/2012 | Frumar et al. | |
| 2013/0080895 A1 | 3/2013 | Rossman et al. | |

FOREIGN PATENT DOCUMENTS

| | | |
|---|---|---|
| EP | 1 746 600 A1 | 1/2007 |
| EP | 2 161 722 A1 | 3/2010 |
| KR | 10-2004-0086916 A | 10/2004 |
| KR | 10-2008-0078174 A | 8/2008 |
| KR | 10-2010-0091990 A | 8/2010 |
| WO | WO 2009/015339 A2 | 1/2009 |
| WO | WO 2010/111001 A2 | 9/2010 |

* cited by examiner

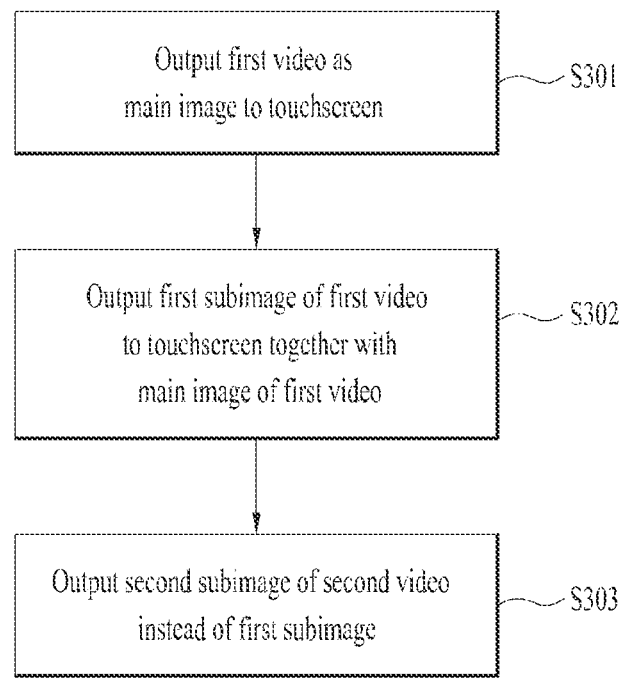

FIG. 4
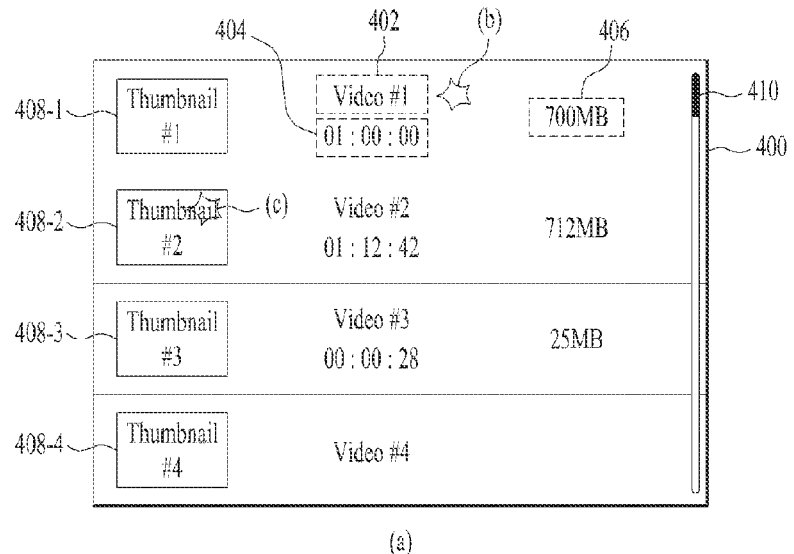
(a)
(b)
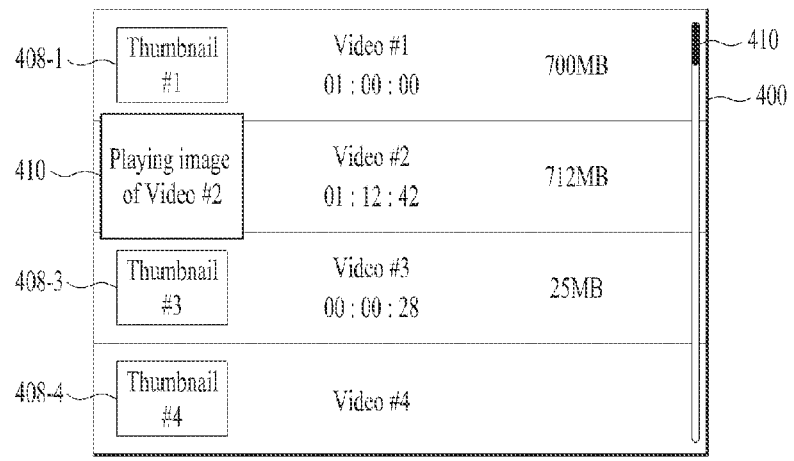
(c)

FIG. 6
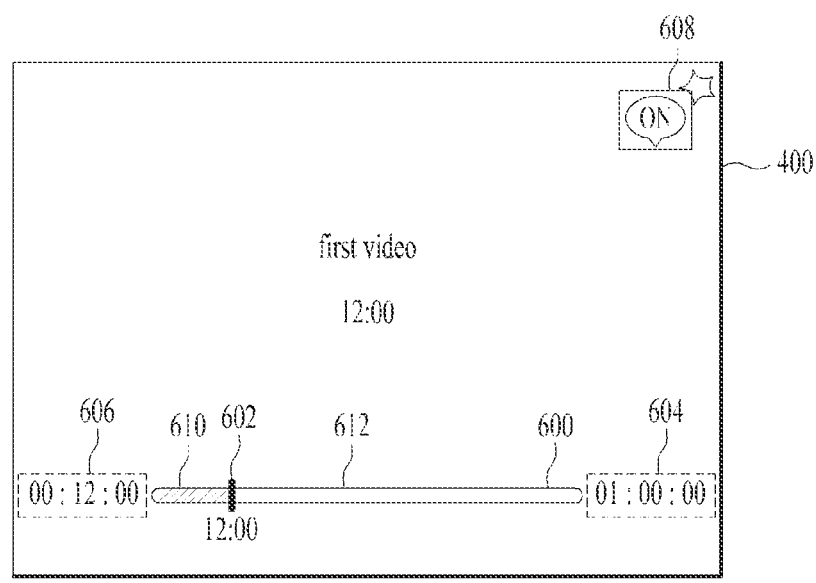
(a)
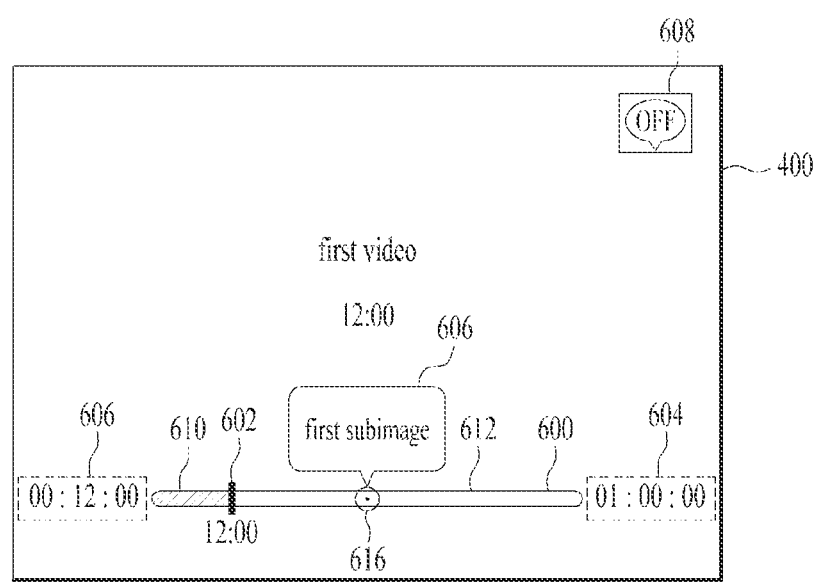
(b)

FIG. 7
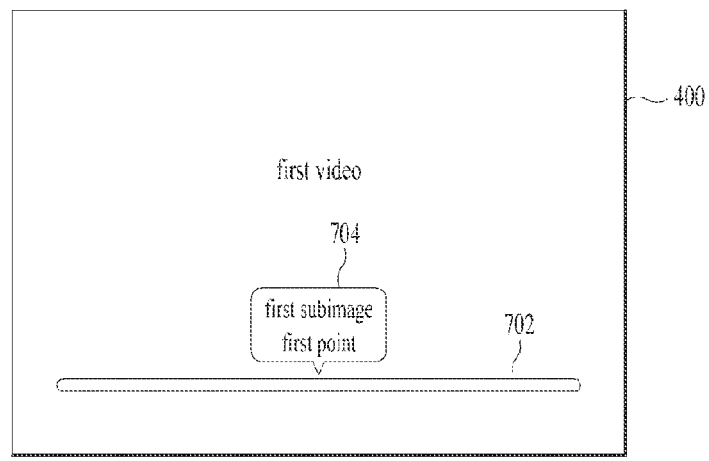
(a)
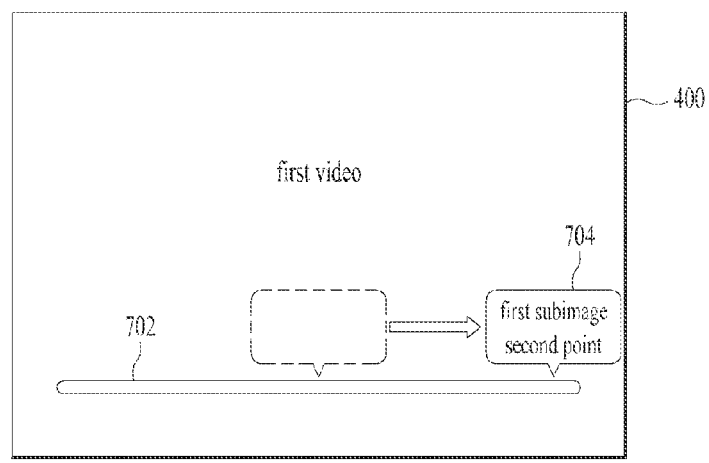
(b)
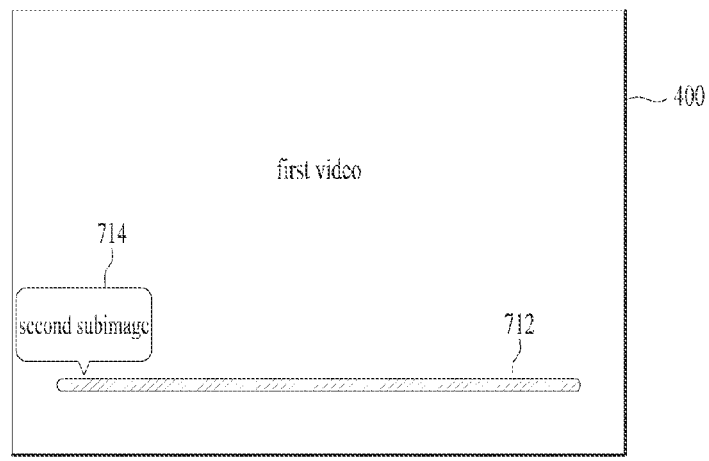
(c)

FIG. 9
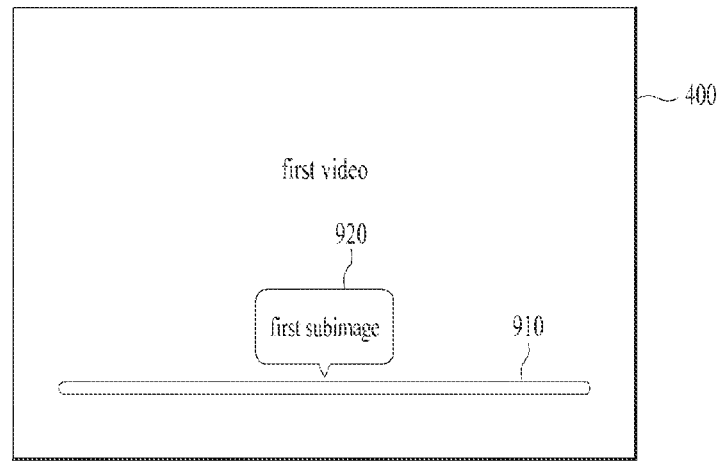
(a)
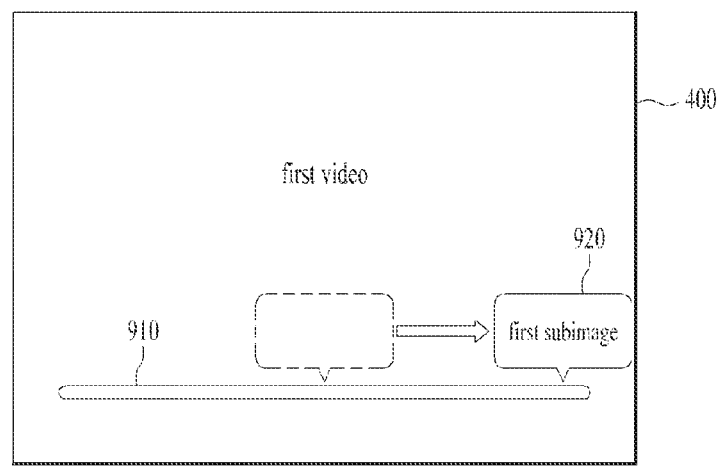
(b)
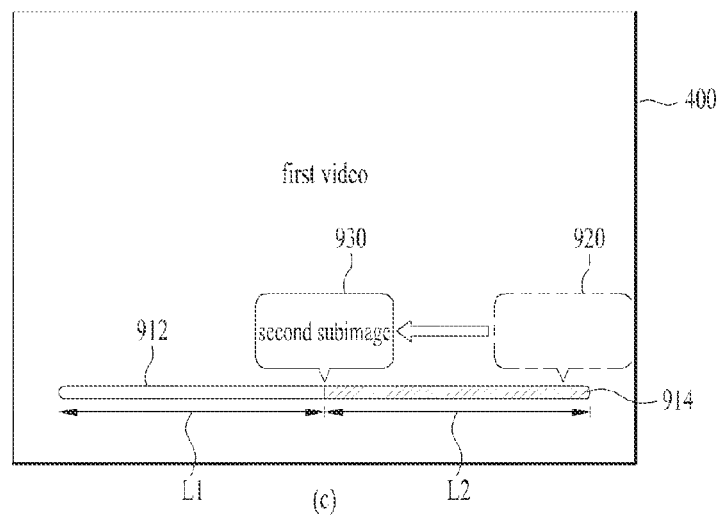
(c)

FIG. 12
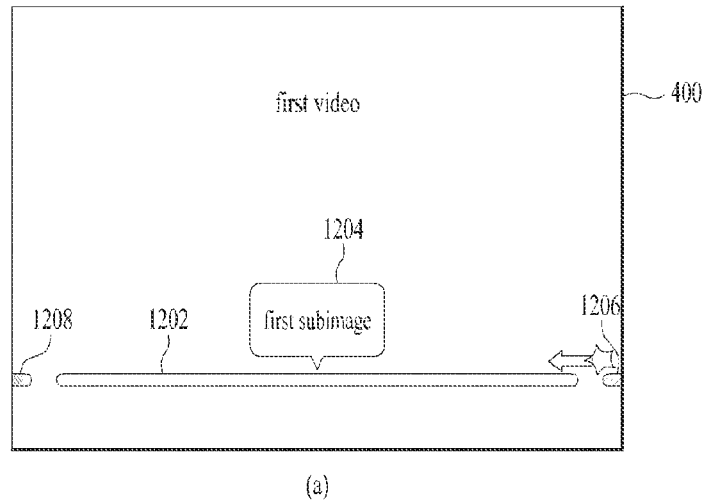
(a)
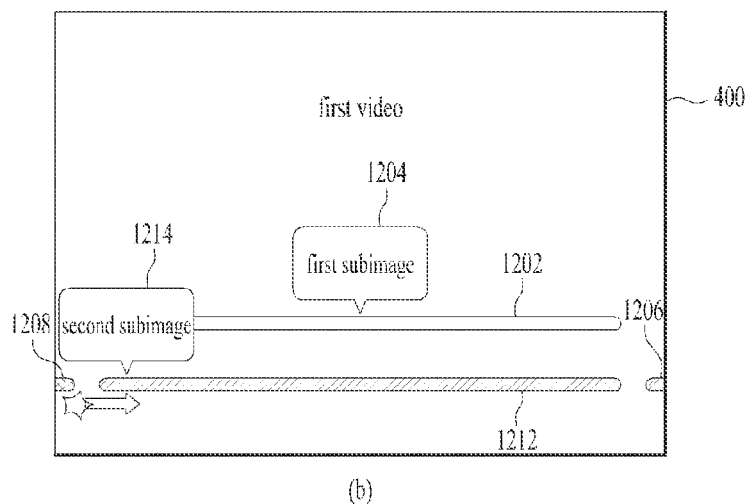
(b)
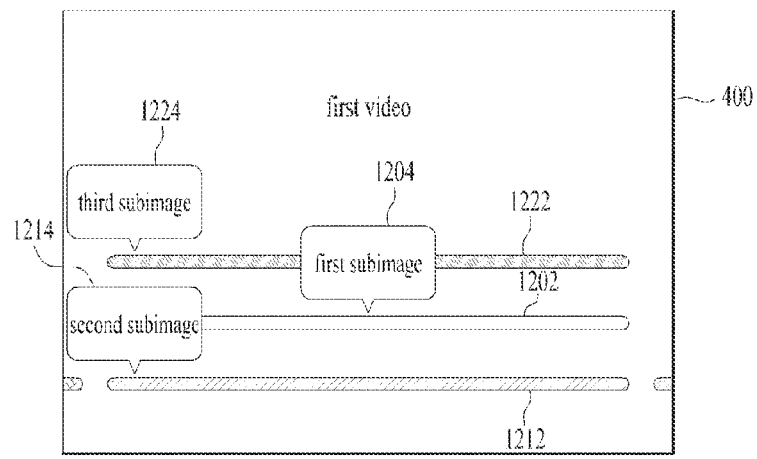
(c)

FIG. 13
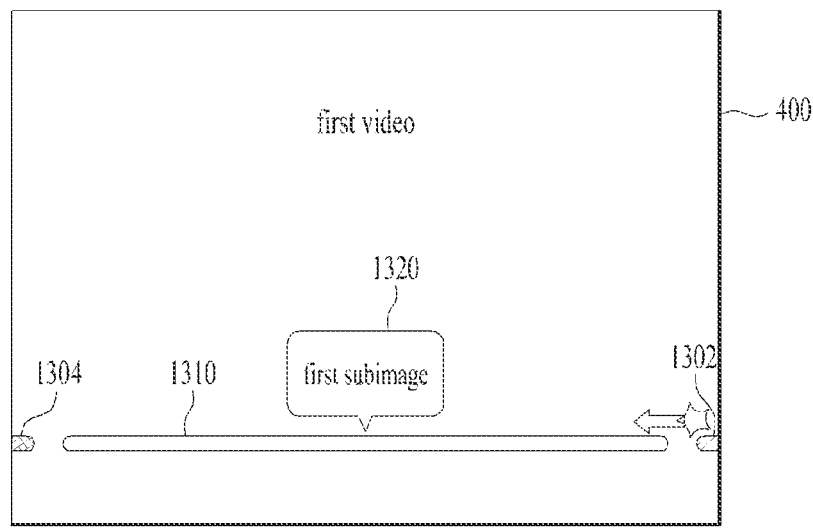
(a)
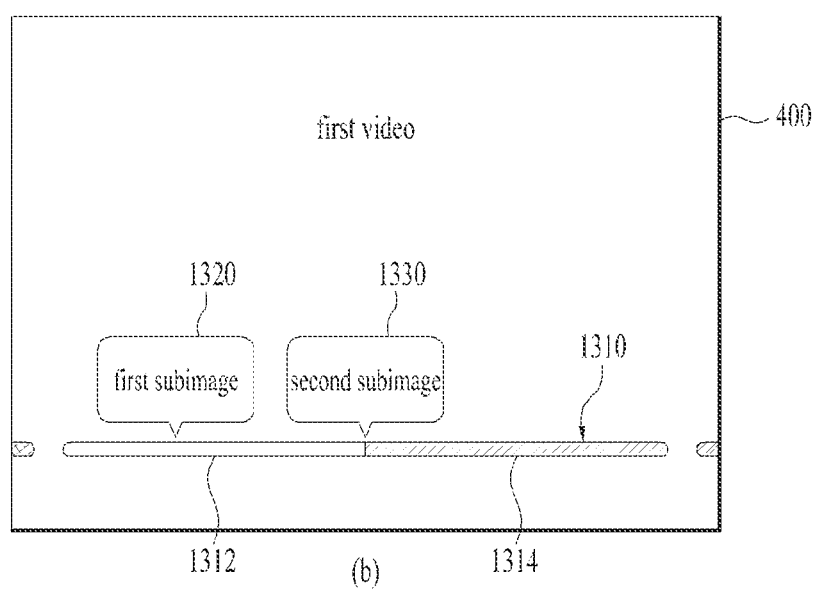
(b)

FIG. 14
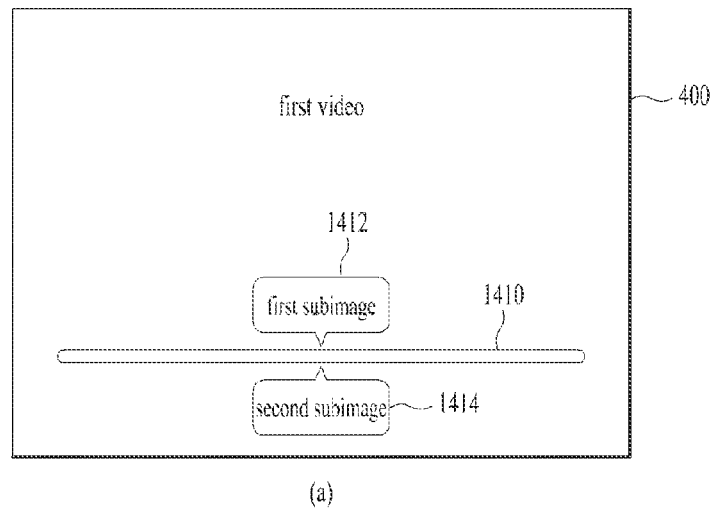
(a)
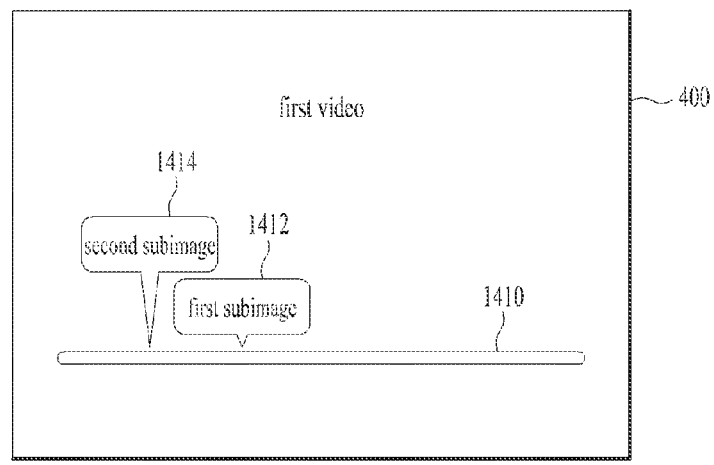
(b)
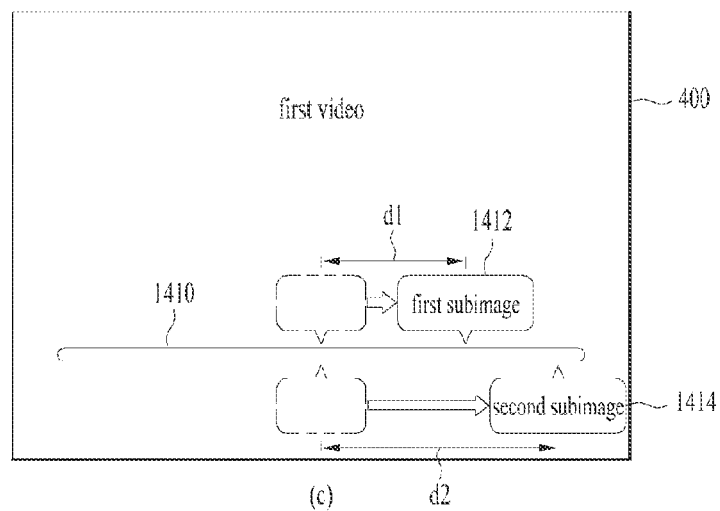
(c)

FIG. 15
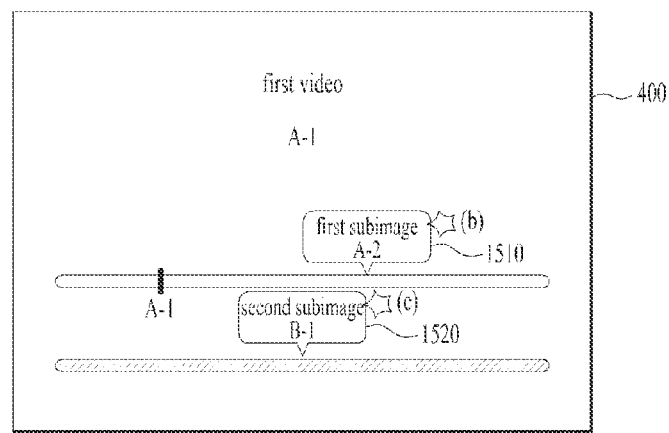
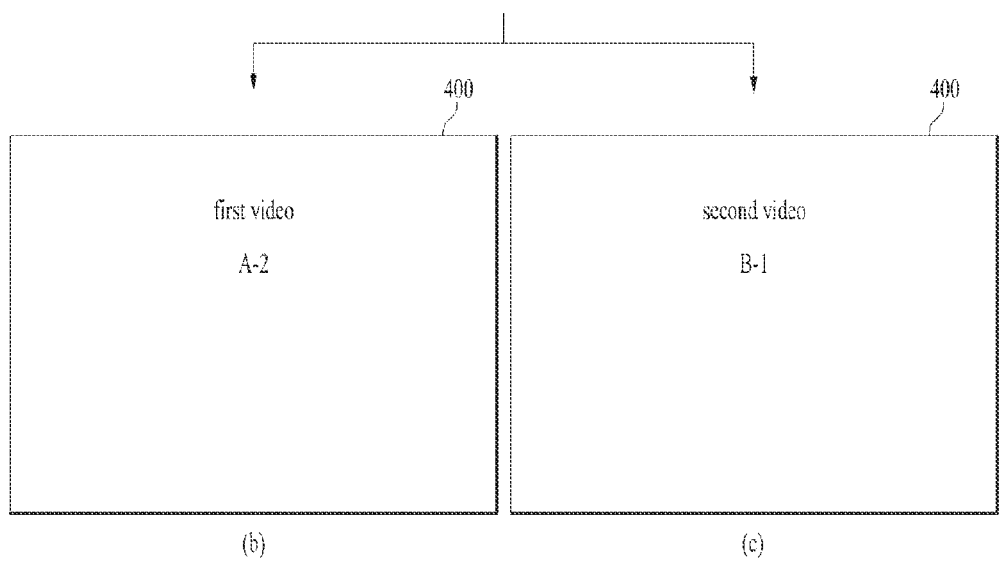

MOBILE TERMINAL AND CONTROLLING METHOD THEREOF

This application is a continuation of application Ser. No. 13/763,871, filed on Feb. 11, 2013, which claims the benefit of earlier filing date and right of priority to Korean Application No. 10-2012-0018982, filed on Feb. 24, 2012, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for searching for a content of a second video when playing back a first video.

Discussion of the Related Art

Generally, terminals can be classified into mobile/portable terminals and stationary terminals. The mobile terminals can be classified into handheld terminals and vehicle mount terminals.

As functions of the terminal are diversified, the terminal is implemented as a multimedia player provided with composite functions such as photographing of photos or moving pictures, playback of music or moving picture files, game play, broadcast reception and the like for example.

Recently, as multimedia functionality of a mobile terminal tends to be reinforced, a user generally needs various kinds of convenient functions to play back videos. One of the convenient functions is a search function to facilitate a user to find a desired part of a video that is being played back. In order to implement the search function, a progress bar and an indicator are displayed on a mobile terminal to indicate a play specific time of a currently played video. In particular, the progress bar has a configuration of a bar type to display a running time of a video and the indicator has a configuration to indicate a current play specific time in a total running time of the video. In more particular, a video output via a display may be understood as corresponding to a specific time indicated by the indicator on the progress bar.

According to the related art, a user can adjust an output time of a video by adjusting a position of an indicator on a progress bar. However, when a position of an indicator is adjusted, a user is unable to acquire information, which indicates what kind of scene will be output at the adjusted position, in advance. Thus, the user has difficulty in finding an exact point of a scene that user actually wants to view. Moreover, when a part desired to play by a user is contained in a video other than a currently played video, it is inconvenient for a user to play the corresponding video containing the desired part after terminating the playback of the currently played video.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which a plurality of videos can be searched simultaneously and effectively.

Another object of the present invention is to provide a mobile terminal and controlling method thereof, by which contents of a second video different from a first video can be searched when outputting the first video as a main image.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen configured to display a playing image of a video and to receive a touch input and a controller controlling a first video to be displayed as a main image, the controller controlling at least one of a first subimage of the first video and a second subimage of a second video to be further displayed while the first video is output as the main image.

In another aspect of the present invention, a method of controlling a mobile terminal according to the present invention may include the steps of displaying a first video as a main image, displaying a first subimage of the first video together with the first subimage, and displaying a second subimage of a second video together with or instead of the first subimage.

Effects obtainable from the present invention are not limited by the above mentioned effect. In addition, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 3 is a flowchart illustrating a method of controlling a mobile terminal according to one embodiment of the present invention;

FIG. 4 is a diagram illustrating display screen configurations to provide a first video as a main image;

FIG. 6 is a diagram illustrating display screen configurations to describe that a first subimage of a first video is displayed on a touchscreen while the first video is output as a main image;

FIG. 7 is a diagram illustrating display screen configurations to describe that a second subimage is displayed when an output of a first subimage is ended;

FIG. 9 is a diagram illustrating display screen configurations to describe that a first subimage is switched to a second subimage after a portion of a progress bar has been changed;

FIG. 12 is a diagram illustrating display screen configurations to describe that both a first subimage and a second subimage are simultaneously displayed;

FIG. 13 is a diagram illustrating another example of display screen configurations to describe that both a first subimage and a second subimage are simultaneously displayed;

FIG. 14 is a diagram illustrating display screen configurations to describe that a first subimage and a second subimage are displayed using a single progress bar;

FIG. 15 is a diagram illustrating display screen configurations to describe that a first subimage or a second subimage is output by being converted to a main image;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
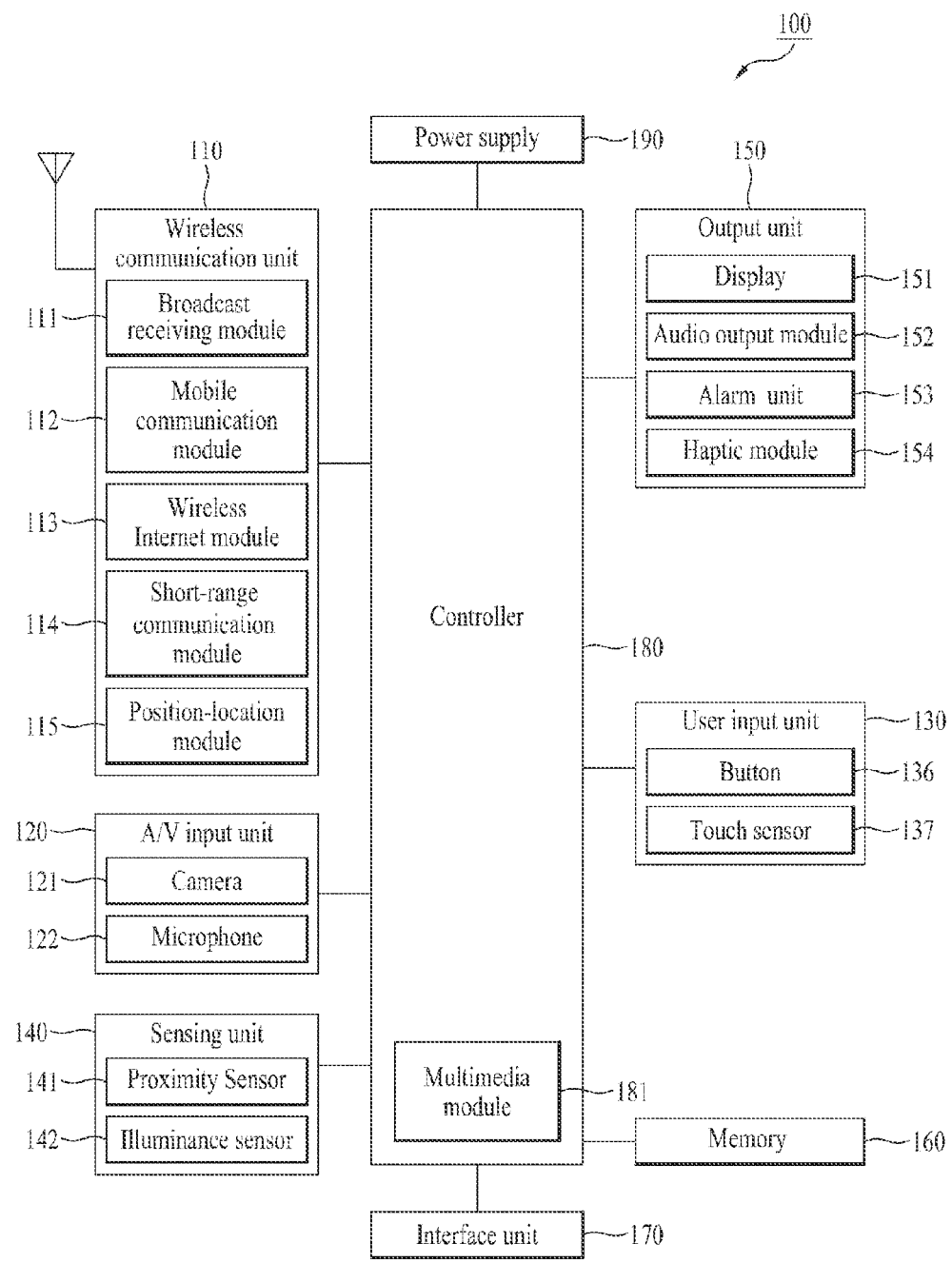
FIG. 1 is a block diagram of a mobile terminal according to one embodiment of the present invention.

FIG. 1 is a block diagram of a mobile terminal according to one embodiment of the present invention. Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence. First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MEDIAFLO®) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this instance, the wireless Internet technology can include WLAN (Wireless LAN) (-WI-FI), WIBRO (Wireless broadband), WIMAX (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as BLUETOOTH and ZIGBEE, to name a few. The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated when receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc. FIG. 1 illustrates the user input 130 including a button 136 and touch sensor 137. Other types of input mechanisms are also available.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141 and illuminance sensor 142.

The output unit 150 generates outputs relevant to the senses of sight, hearing, touch and the like. In addition, the output unit 150 includes the display unit 151, an audio output module 152, an alarm unit 153, a haptic module 154, a projector module (not showing in drawings) and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user can see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 by being spaced apart from each other or being built in one body. Alternatively, a plurality of display units can be arranged on different faces of the mobile terminal 100.

When the display unit 151 and a sensor for detecting a touch action (hereinafter called 'touch sensor') configures a mutual layer structure (hereinafter called 'touchscreen'), the display unit 151 can be used as an input device as well as an output device. In this instance, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, the touch sensor can detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display unit 151 is touched.

Referring to FIG. 1, a proximity sensor 141 can be provided to an internal area of the mobile terminal 100 enclosed by the touchscreen or around the touchscreen. The proximity sensor 141 is the sensor that detects a presence or non-presence of an object approaching a prescribed detecting surface or an object existing around the proximity sensor using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. In addition, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

A projector module can also be included and is the element for performing an image projector function using the mobile terminal 100. In addition, the projector module can display an image, which is identical to or partially different at least from the image displayed on the display unit 151, on an external screen or wall according to a control signal of the controller 180.

In particular, the projector module can include a light source generating light (e.g., laser) for projecting an image externally, an image producing means for producing an image to output externally using the light generated from the light source, and a lens for enlarging to output the image externally in a predetermined focus distance. In addition, the projector module can further include a device for adjusting an image projected direction by mechanically moving the lens or the whole module.

The projector module can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module.

Preferably, the projector module can be provided in a length direction of a lateral, front or backside direction of the mobile terminal 100. In addition, it is understood that the projector module can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
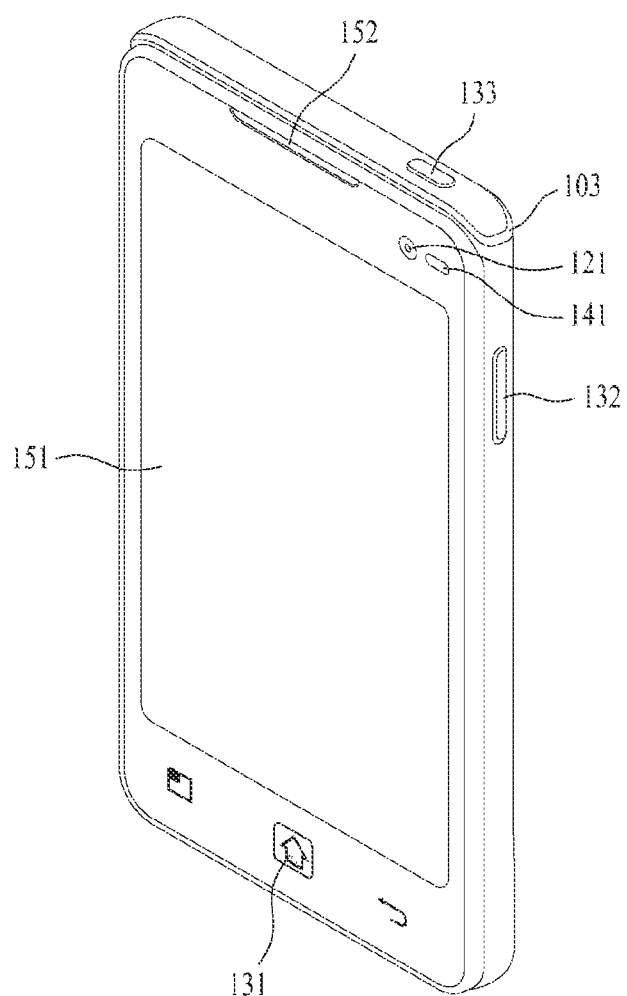
FIG. 2A is a front perspective diagram of a mobile terminal according to one embodiment of the present invention.
Figure 2B:
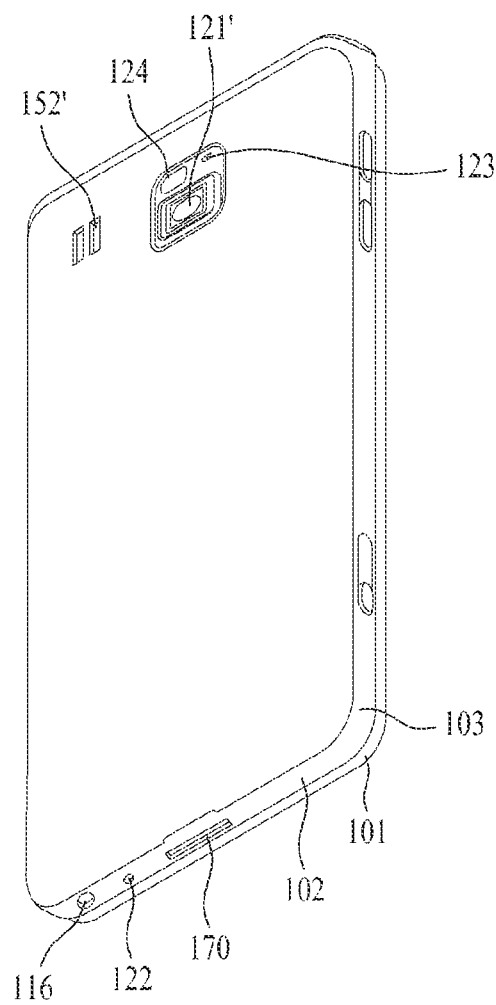
FIG. 2B is a rear perspective diagram of a mobile terminal according to one embodiment of the present invention.

FIG. 2A is a front perspective diagram of a mobile terminal according to one embodiment of the present invention. And, FIG. 2B is a perspective diagram of a backside of the terminal shown in FIG. 2A. The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIGS. 2A and 2B, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 170 and the like can be provided to the terminal body, and more particularly, to the front case 101. The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display unit 151 or the like can be input to the second manipulating unit 132.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

A power supply unit 190 (FIG. 1) for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad for detecting a touch can be additionally provided to the rear case 102. The touchpad can be configured in a light transmittive type like the display unit 151. In this instance, if the display unit 151 is configured to output visual information from its both faces, it can recognize the visual information via the touchpad as well. The information output from both of the faces can be entirely controlled by the touchpad. Alternatively, a display is further provided to the touchpad so that a touchscreen can be provided to the rear case 102 as well.

The touchpad is activated by interconnecting with the display unit 151 of the front case 101. The touchpad can be provided in rear of the display unit 151 in parallel. The touchpad can have a size equal to or smaller than that of the display unit 151.

In the following description, embodiments related to a control method implemented in the above-configured mobile terminal is explained with reference to the accompanying drawings. For clarity, assume that a mobile terminal mentioned in the following description includes at least one of the components shown in FIG. 1. In particular, assume that a mobile terminal according to the present invention includes the display unit 151, the memory 160 and the controller 180. When a video content is saved in a remote terminal, the mobile terminal according to the present invention may further include the wireless communication unit 110 configured to play back the video content by streaming. Furthermore, if the display unit 151 includes a touchscreen, implementation of the following embodiments may be further facilitated. Therefore, the following description is made on the assumption that the display unit 151 includes a touchscreen 400 (Referring to FIG. 2A). When the display unit 151 does not include the touchscreen 400, the mobile terminal may further include an input device configured to receive a user input.

The touchscreen 400 may display a video content thereon and may receive various kinds of user commands for actions of play, stop, pause, editing and the like of the video content via a pointer. In this instance, the video content may be saved in the memory 160 of the mobile terminal or may be saved in a remote terminal. The controller 180 controls the video content saved in the memory 160 to be displayed on the touchscreen 400. In addition, the controller 180 receives the video content saved in the remote terminal via the wireless communication unit 110 and can then play back the received video content on the touchscreen 400 by streaming.

The controller 180 controls a first video to be displayed as a main image on the touchscreen 400 and can control the touchscreen 400 to display a first subimage of the first video together with the main image of the first video. Moreover, the controller 180 can control a second subimage of a second video to be displayed on the touchscreen 400 together with or instead of the first subimage. In this instance, an $N^{th}$ video may mean a prescribed video file, which is being played or can be played by the controller 180, among a plurality of video files saved in the memory 160 or a remote terminal.

For clarity of the following description of the present invention, one video file currently played as a main image on the touchscreen 400 is named a first video and another video file playable in order next or previous to that of the first video is named a second video. If it is necessary to identify a video playable in order next or previous to that of the first video, the second video is described as the video playable in order next to that of the first video and a third video is described as the video playable in order previous to that of the first video. Unless special description is provided, the second video should be understood as meaning the video playable in order next or previous to that of the first video.

If a first video is output as a main image, it may mean that a played image in a specific time of the first video or a pause image in the specific time of the first video is displayed. While a first video is output as a main image, a first subimage is provided as a preview or thumbnail image to display an image at a specific time of the first video. Specific time may equal to or different from a time of the main image of the first video.

While the first video is output as the main image, a second subimage is provided as a preview or thumbnail image in a specific time of a second video different from the first video. A main image is a primary view region of a user and a subimage may play a role as an output time adjusting region of a main image or a secondary view region of the user. The main image may be substantially output to the touchscreen 400 in full screen mode.

In addition, the subimage may be output to the touchscreen 400 in a screen size smaller than that of the main image while the main image is output. The controller 180 can control at least one of a first progress bar related to the first video and a second progress bar related to the second video to be displayed on the touchscreen 400. An $N^{th}$ progress bar represents a running time of an $N^{th}$ video as a bar type. The $N^{th}$ progress bar may indicate a total running time of the $N^{th}$ video or at least one portion of the total running time of the $N^{th}$ video.

When the total running time of the $N^{th}$ video amounts to 1 hour and that the $N^{th}$ progress bar indicates the total running time of the $N^{th}$ video, a start point of the $N^{th}$ progress bar may be understood as 0 minute 00 second and an end point of the $N^{th}$ progress bar may be understood as 1 hour, 0 minute and 00 second. Moreover, an $N^{th}$ main image indicator indicating a play time of a main image of the $N^{th}$ video and an $N^{th}$ subimage indicator indicating a play time of an $N^{th}$ subimage of the $N^{th}$ video may be displayed on the $N^{th}$ progress bar.

In the following description, embodiments of a control method implemented in the above-configured mobile terminal are explained in detail with reference to the accompanying drawings. For clarity, a reference number 400 shall refer to a display screen of the touchscreen in the embodiments mentioned in the following description. Furthermore, for clarity, assume that display positions of the first and second subimages are situated nearby the first and second progress bars, respectively.

FIG. 3 is a flowchart illustrating a method of controlling a mobile terminal according to one embodiment of the present invention. Referring to FIG. 3, the controller 180 can control a first video to be output as a main image to the touchscreen 400 (S301). In doing so, a video play menu or function of playing the first video may be activated by an appropriate manipulation of the user input unit 130. For instance, a user selects a desired first video file after activation of a video play application or a file browser application, whereby the first video can be played back as the main image. When the first video is played back as the main image, the controller 180 may play back the first video from the beginning. Alternatively, the controller 180 can control a playback of the first video to be resumed in continuation with a previously play-stopped time of the first video.

FIG. 4 is a diagram illustrating an example of display screen configurations to provide a first video as a main image. In particular, FIG. 4(a) is a diagram illustrating one example of a screen for providing a playable video list to a user.

Referring to FIG. 4(a), if a user selects a video play application, the controller 180 can control a playable video list to be output. In particular, the playable video list shown in FIG. 4(a) may be provided by sorting out at least one of a list of videos saved in the memory 160 or a video list saved in a remote terminal or randomly outputting one of the lists to the touchscreen 400.

When the playable video list exceeds an outputtable capacity of the touchscreen 400, the user can check the playable video list by scrolling the touchscreen 400 upward and downward. Moreover, when the playable video list exceeds the outputtable capacity of the touchscreen 400, the controller 180 displays a scroll bar 410 to enable the user to scroll the touchscreen 400 upward and downward. In particular, a file name 402, a running time 404, a file size 406, a thumbnail image 408 and the like of each of the videos may be displayed on the playable video list.

If the user touches a play-desired video file on the playable video list (e.g., a region on which a file name of a video #1 is displayed is touched in FIG. 4(a)), referring to FIG. 4(b), the controller 180 can control the selected video (e.g., the video #1) to be played as a main image. Moreover, while the selected video is played, the controller 180 can control a progress bar indicating a running time of the currently played video, a play icon for receiving an input of a command for playing the selected video file, a pause icon for receiving an input of a pause command and the like to be displayed on the touchscreen 400. Yet, it is not necessary for the progress bar, the play icon, the pause icon and the like to be displayed as soon as the selected video starts to be played. Instead, the progress bar, the play icon, the pause icon and the like may be displayed if an appropriate touch gesture is performed on the touchscreen 400 when playback of the selected video.

In FIG. 4(a) and FIG. 4(b), the selected video is played as the main image for example. Yet, it is not necessary for the user-selected video file to be output as the main image, as shown in FIG. 4(b). According to another example of the present invention, before the user-selected video file is output as the main image, the controller 180 can control the user-selected video file to be played as a preview on the screen for providing the playable video list.

FIG. 4(c) is a diagram illustrating one example to describe that a selected video file is played as a preview on a playable video list providing screen. For example, if a thumbnail image 408 of a video desired to be played is touched on the playable video list providing screen shown in FIG. 4(a) (e.g., a thumbnail #2 408-2 is touched in FIG. 4(a)), the controller 180 can control the selected video to be displayed on the playable video list. In doing so, the controller 180 can control the currently preview-played video file to be emphasized, as shown in FIG. 4(c), in a manner that a size of the region of the preview image 410 is set greater than that of the region for displaying the thumbnail image 408.

As mentioned in the foregoing description with reference to FIG. 4, the controller 180 can control a user-selected video to be played as a main image or a preview image. In FIG. 4, if a user touches a file name output region in a playable video list, a selected video is displayed as a main image (FIG. 4(b)). If a thumbnail image output region is touched, a selected video is displayed as a preview image (FIG. 4(c)).

The controller 180 can determine a playback type of a selected video depending on what region is touched in the playable video list (FIG. 4(b), FIG. 4(c)). However, it is not necessary to determine the playback type of the selected video in accordance with FIG. 4(b) or FIG. 4(c). For example, the controller 180 can determine a playback type of a video based on whether a user's touch input is a simple touch or a long touch (e.g., a pointer is made to come in contact with a touchscreen fore prescribed duration). For another example, the controller 180 can determine a playback type of a video depending on whether a user's touch input is a proximity touch or a contact touch. In particular, if a play-desired video on a playable video list is contact-touched, the controller 180 plays the selected video as a main image. If a play-desired video is proximity-touched, the controller 180 may plays the selected video as a preview image.

Figure 5:
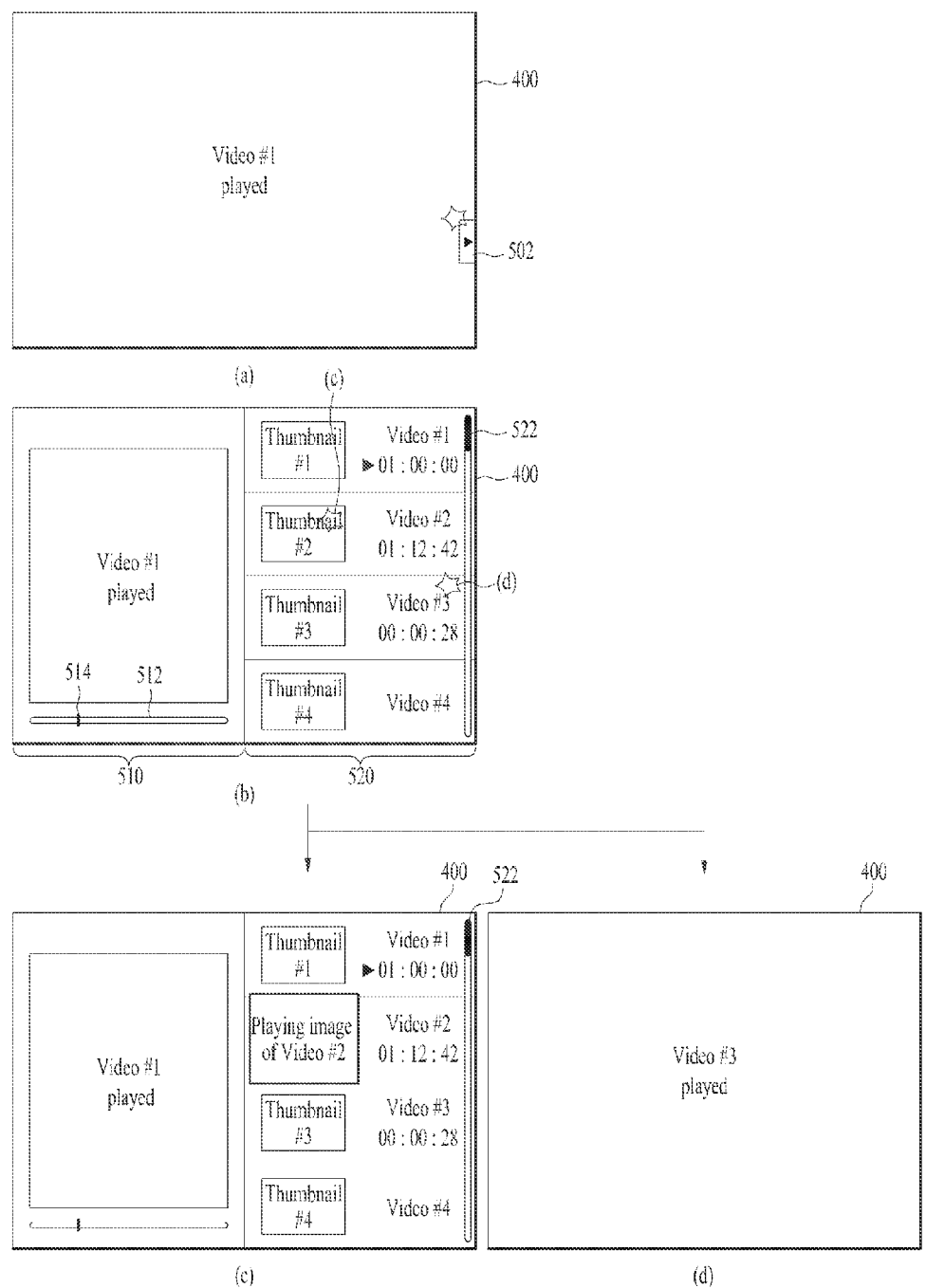
FIG. 5 is a diagram illustrating display screen configurations to describe that a video playable list is displayed while a first video is output as a main image.

The controller 180 of the mobile terminal according to one embodiment of the present invention can display a playable video list while a first video is output as a main image by a user. This is described in detail with reference to FIG. 5 as follows. FIG. 5 is a diagram illustrating an example of display screen configurations to describe that a video playable list is displayed while a first video is output as a main image. For clarity of the following description, assume that a $1^{st}$ video includes the video #1 selected by a user in FIG. 4(b).

Referring to FIG. 5, while a video #1 is output as a main image, if a user selected a playable video list load button 502 (FIG. 5(a)), the controller 180 partitions a touchscreen 400 into a first region 510 and a second region 520 and may then control a playing image of the video #1 and a playable video list to be displayed on the first region 510 and the second region 520, respectively (FIG. 5(b)). In doing so, the playable video list load button 502 shown in FIG. 5(a) may be displayed by inputting an appropriate touch gesture to the touchscreen 400 when playback of the video #1.

Although FIG. 5(b) shows one example that a progress bar 512 indicating a running time of the video #1 and an indicator 514 indicating a play specific time of the video #1 are displayed together on the first section 510 for displaying the playing image of the video #1, the progress bar 512 and the indicator 514 may not be displayed.

If a thumbnail image of a random video is selected from the playable video list displayed on the second region 520 (e.g., a thumbnail #2 is touched in FIG. 5(b)), referring to FIG. 5(c), the controller 180 controls playing image of the video #1 and the playable video list to keep being displayed on the first region 510 and the second region 520, respectively, and can also control a selected video #2 to be displayed as a preview image.

In doing so, as mentioned in the foregoing description with reference to FIG. 4(*c*), the controller 180 can control a preview image to be emphasized. If a video file name displayed region is touched in FIG. 5(*b*) (e.g., a video #3 is touched in FIG. 5(*b*)), the controller 180 controls the #1 video to stop being played and may also control the selected video to be output as a main image (cf. FIG. 5(*d*)). In particular, referring to FIG. 5(*b*) and FIG. 5(*c*), depending on which region is touched in the playable video list, the controller 180 can determine whether to play the selected video as a preview image or a main image substituting for the #1 video.

The controller 180 can determine whether to play the selected video as a preview image or a main image substituting for the #1 video in accordance with a user's touch gesture. For instance, when a play-desired video file on the playable video list displayed on the second region 520 is simple-touched, the controller 180 controls the selected video file to be displayed as the preview image.

On the contrary, if a first point within a display region of the play-desired video file in the playable video list displayed on the second region 520 and a random second point of the first region 510 are touched, the controller 180 can control the selected video to be displayed as the main image substituting for the #1 video. In this instance, the touches to the first and second points may include one of an action of touching both of the first and second points simultaneously and substantially, an action of touching the first point and the second point sequentially, an action of dragging a pointer to the second point from the first point and the like.

In another instance, the controller 180 can determine whether to play the selected video as a main image depending on whether a user's touch input includes a proximity touch or a contact touch. In particular, if a play-desired video on a video play list is contact-touched, the controller 180 controls the selected video to be played as the main image. If the play-desired video is proximity-touched, the controller 180 can control the selected video to be played as the preview image.

In FIG. 4 and FIG. 5, examples of the touch gesture include a simple touch, a long touch, a touch & drag and the like. Moreover, the touch gesture may be implemented with one of a double touch, a proximity touch, a flicking and the like.

The controller 180 of the mobile terminal according to the present invention can play videos in order of a playable video list. For instance, if the playback of the video file #1 is completed in the play list shown in FIG. 4(*a*), the controller 180 controls the video file #2 to be played. If the playback of the video file #2 is completed, the controller 180 can control the video file #3 to be played.

In another instance, when a first video is output as a main image, the controller 180 of the mobile terminal according to the present invention automatically creates a play list of other videos, each of which has a file name similar to that of the first video, and may then control the videos included in the play list to be consecutively played. If the videos, each of which has the file name similar to that of the first video, are added to the play list, it can consecutively play the videos in a series to which the first video belongs. In this instance, if the playback of the first video is completed, the controller 180 can play a second video corresponding to a play order next to that of the first video among other video files added to the play list.

Referring now to FIG. 3, while the first video is output as the main image, if an appropriate touch gesture is input to the touchscreen 400, the controller 180 can control a first subimage of the first video to be displayed on the touchscreen 400 (S302). How to display the first subimage of the first video on the touchscreen 400 can refer to the diagram shown in FIG. 6.

FIG. 6 is a diagram illustrating an example of display screen configurations to describe that a first subimage of a first video is displayed on a touchscreen while the first video is output as a main image. Referring to FIG. 6, while the first video is output as the main image (FIG. 4(*b*)), if an appropriate touch gesture (e.g., a touch to the touchscreen 400) is input, the controller 180 can control a progress bar 600 to be displayed (FIG. 6(*a*)). In doing so, a main image indicator 602 may be displayed on the progress bar 600 to indicate an output time of the first video corresponding to the main image.

In particular, the main image indicator 602 can indicate a specific time corresponding to the main image in a full running time of the first video. Since the main image indicator 602 indicates 12 minutes in the total running time of the first video, 12 minutes in the total running time of the first video is output as the main image. Moreover, a user can adjust an output time of the main image by adjusting a position of the main image indicator 602 along the progress bar 600. For instance, if the main image indicator 602 is adjusted to the time of 14 minutes from the time of 12 minutes, the controller 180 can control a scene corresponds to the specific time, which corresponds to the 14 minutes in the total running time of the first video, to be output as the main image.

A time 606 which is indicated by the main image indicator 602, and a total running time 604 (e.g., 1 hour in FIG. 6) may be displayed on both ends of the progress bar 600, respectively. Moreover, the controller 180 can control a left part 610 and a right part 612 of the progress bar 600 to be visually discriminated from each other by setting a boundary to a display position of the main image indicator 602. This is to discriminate a played part and a non-played part of the first video from each other.

While the first video is played as the main image, if an input of a touch to a subimage icon 608 is received, referring to FIG. 6(*b*), the controller 180 controls a subimage indicator 616, to be displayed on the progress bar 600 and also controls the first subimage 606 at a specific time indicated by the subimage indicator 616 to be displayed. In this instance, the first subimage may include a playing image of the first video at the specific time indicated by the subimage indicator 616 or a still image of the first video at the specific time indicated by the subimage indicator 616.

An initial display position of the first subimage indicator 616 may be randomly determined. Alternatively, the initial display position of the first subimage indicator 616 may be determined with predetermined regularity. For instance, the controller 180 can set the initial display position of the first subimage indicator 616 to be determined as one of: i) the same point of a position of the main image indicator 602; ii) one end (e.g., initial start point, final end point, etc.) of the progress bar 600; iii) a time after/before prescribed time from a time at which the main image indicator 602 is situated; iv) a middle point of the progress bar 600; v) a point from which the first subimage indicator 616 disappeared in the past; vi) a prescribed position previously set on the progress bar 600; and vii) a preset prescribed time.

While the first subimage 606 and the first subimage indicator 616 are displayed, if an input of a touch to the subimage icon 608 is received again, the controller 180 may stop displaying the first subimage 606 and the first subimage indicator 616.

According to the description of the above example, the controller 180 can determine whether to display the first subimage depending on the touch input to the subimage icon 608. According to another embodiment of the present invention, the controller 180 can determine whether to display a first subimage in accordance with a user's touch input to a first progress bar. In particular, the controller 180 discriminates an input of a contact touch to a progress bar from an input of a proximity touch to the progress bar. If the contact touch is input, the controller 180 recognizes it as to adjust a position of a main image indicator. If the proximity touch is input, the controller 180 recognizes it as to display a first subimage. Thus, as mentioned in the foregoing description of the example, without a touch to the subimage icon 608, the controller 180 can recognize the proximity touch to the first progress bar as to display the first subimage. In this instance, an initial display position of the first subimage indicator 616 may become a proximity touch position.

The screen configurations shown in FIG. 6 are exemplarily provided for clarity of the description, by which the present invention is not limited. For instance, although FIG. 6(b) shows that both of the first subimage indicator 616 and the main image indicator 602 are simultaneously displayed on the progress bar 600, it is not necessary to simultaneously display the first subimage 606 and the main image indicator 602. When the subimage icon 608 is touched in FIG. 6(a), the controller 180 can control a display of the main image indicator 602 to be omitted while displaying the first subimage 606 and the first subimage indicator 616.

According to another embodiment of the present invention, it is not mandatory for the first subimage indicator 616 to be displayed on the progress bar 600. Namely, even if the first subimage indicator 616 is not displayed on the progress bar 600, the controller 180 can determine an output time of the first subimage 606 based on the display region of the first subimage 606. For instance, referring to the example shown in FIG. 6(b), when the first subimage 606 is represented as a dialogue box, since a part protruding from the dialogue box may indicate the output time of the first subimage 606, the controller 180 can omit the display of the first subimage indicator 616. If so, a user can change the output time of the first subimage 606 by shifting not the first subimage indicator 616 but the first subimage 606.

For clarity of the following drawings, the main image indicator 602, the subimage indicator 616 and the running times 604 and 606 provided to both ends of the progress bar is omitted. In the following drawing, an output time of a first subimage is changed in a manner that a position of the first subimage is adjusted for example. Yet, when a subimage indicator 616 is displayed on a first progress bar, it is a matter of course that an output time of the first subimage can be changed by shifting the subimage indicator 616. This may exactly apply to the case of a second subimage or a third subimage. Moreover, a touch input for adjusting a position of a first subimage may be understood as including a proximity touch as well as a contact touch.

Referring now to FIG. 3, while the first subimage is output, if an appropriate user input is received, the controller 180 can control a second subimage to be displayed by replacing the first subimage while playing the first video as the main image (S303). In particular, the controller 180 can control the second subimage to be displayed while ending the output of the first subimage.

FIG. 7 is a diagram illustrating an example of display screen configurations to describe that a second subimage is displayed when an output of a first subimage is ended. In FIG. 7(a), for clarity of the following description, assume that a first video is played as a main image and that a first subimage 704 of the first video is situated at a first point of a first progress bar 702. If a user shifts the first subimage 704 from a first point to a second point along the first progress bar 702 (FIG. 7(b)), the controller 180 stops displaying the first subimage 704 and can control a second subimage 714 of a second video to be displayed (FIG. 7(c)). In this instance, the second subimage 714 may represent at least one of a playing image of a specific time of the second video and a still image of the specific time of the second video.

Moreover, the controller can control the first progress bar 702, which indicates a running time of the first video, to be switched to a second progress bar 712 indicating a running time of the second video. In this instance, the second point may indicate at least one of a start point of the first progress bar 702 and an end point of the first progress bar 702.

When the first subimage 704 includes a playing image of the first video, the first subimage 704 can automatically move toward the end point of the first progress bar 702. Even if the first subimage 704 automatically moves to the end point of the first progress bar 702, the controller 180 can control the first progress bar 702 and the first subimage 704 to be switched to the second progress bar 712 and the second subimage 714, respectively. As mentioned in the foregoing description with reference to FIG. 6, a subimage indicator corresponding to an output time of the second subimage 714 may be displayed on the second progress bar 712. Moreover, as the first progress bar 702 is switched to the second progress bar 712, the main image indicator indicating the output time of the main image may stop being displayed.

When the second subimage 714 is displayed by replacing the first subimage 704, the second subimage 714 may be displayed at a start point of the second progress bar 712, as initially shown in FIG. 7(c). Furthermore, the controller 180 can control the second subimage 714 to be situated at a position corresponding to at least one of a middle point of the second progress bar 712, a preset prescribed position on the second progress bar and a preset prescribed time.

The controller 180 can display a playing image in a specific time of a second video or a still image in the specific time of the second video. In particular, the controller 180 can control the second video to be output as a subimage to the touchscreen 400 while outputting the first video as a main image to the touchscreen 400.

When the second subimage 704 is moving along the second progress bar 712 in response to a user's touch input, the controller 180 can control a playing or still image in the specific time corresponding to a position, to which the second subimage 704 has moved, to be output as the second subimage 704. Hence, the user can search for a content of a second video different from the first video when watching the first video.

If a first subimage indicator indicating an output time of the first subimage 704 is displayed on the first progress bar 702, when the first subimage indicator has even moved from the first point to the second point, the controller 180 can control the first progress bar 702 and the first subimage 704 to be switched to the second progress bar 712 and the second subimage 714.

Although FIG. 7(b) shows one example that the second point is the end point of the first progress bar 702, as mentioned in the foregoing description, the second point may include the start point of the first progress bar 702. The controller of the present invention discriminates when the first subimage 704 is shifted to the start point of the first progress bar 702 from when the first subimage 704 is shifted to the end point of the first progress bar 702. If the first subimage 704 is shifted to the end point of the first progress bar 702, the controller 180 can control the first subimage 704 and the first progress bar 702 to be switched to the second subimage 714 and the second progress bar 712 for the second video to be played next to the first video, respectively. If the first subimage 704 is shifted to the start point of the first progress bar 702, the controller 180 can control the first subimage 704 and the first progress bar 702 to be switched to a third subimage and a third progress bar for a third video playable in order previous to that of the first video, respectively.

FIG. 7 shows one example that the second subimage 704 is output only if the first subimage 704 is shifted to the second point of the first progress bar 702, by which the present invention is not limited. Even if the first subimage 704 is not shifted to the second point, the first subimage 704 can be replaced by the second subimage 704 through an appropriate touch gesture. In addition, its details are explained with reference to FIG. 8 as follows.

Figure 8:
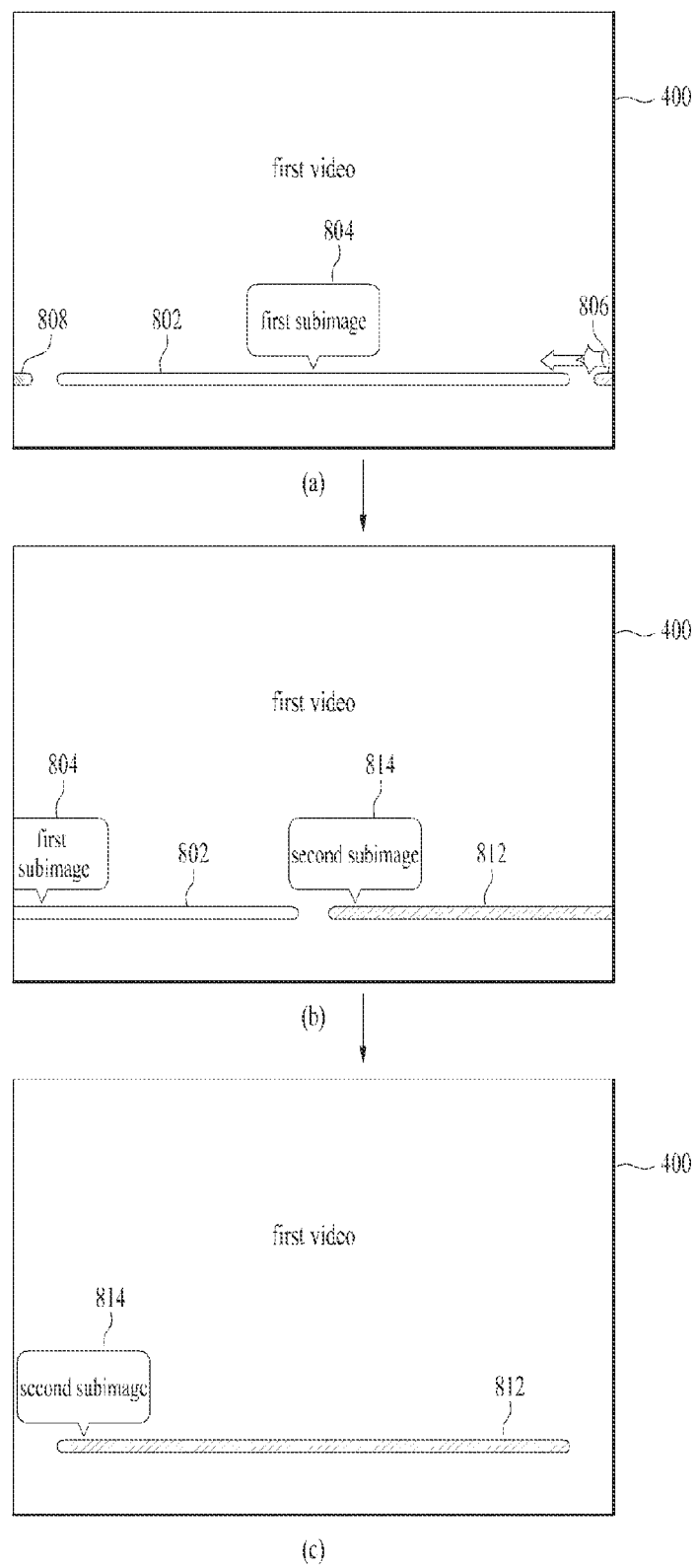
FIG. 8 is a diagram illustrating display screen configurations to describe that a second subimage is displayed instead of a first subimage.

Next, FIG. 8 is a diagram illustrating an example of display screen configurations to describe that a second subimage is displayed instead of a first subimage. Referring to FIG. 8, when there is a playable order next or previous to that of a first video, the controller 180 can control cue objects 806 and 808, each of which is provided to indicate the presence of the next or previous playable order, to be displayed (FIG. 8(a)). The cue object 806 displayed on the right side of an end point of a first progress bar 802 may indicate that a playable order next to that of the first video exists. In addition, the cue object 808 displayed on the left side of a start point of the first progress bar 802 may indicate that a playable order previous to that of the first video exists.

Regarding the cue object 806 and 808 situated nearby both ends of the first progress bar 802, if a touch gesture (e.g., a touch & drag performed on the cue object 806 in left direction) is performed on the cue object (i.e., a first cue object) 806 adjacent to the right side of the first progress bar 802, referring to FIG. 8(b) and FIG. 8(c), the controller 180 can control the first progress bar 802 and a first subimage 804 of the first video to be replaced by a second progress bar 812 and a second subimage 814 of a second video, respectively. In this instance, the second video may be understood as including a video playable in order next to that of the first video.

On the contrary, if a touch gesture is performed on the cue object 808 situated on the left side of the first progress bar 802 in the example shown in FIG. 8(a), the controller 180 can control the first progress bar 802 and the first subimage 804 of the first video to be replaced by a third progress bar and a third subimage of a third video, respectively (not shown in the drawing). In this instance, the third video may be understood as including a video playable in order previous to that of the first video.

In the examples shown in FIG. 7 and FIG. 8, when the first subimage is switched to the second subimage, the first progress bar indicating a running time of the first video is switched to the second progress bar indicating a running time of the second video, by which the present invention is not limited. In addition, it is not mandatory for the first progress bar to be switched to the second progress bar. For instance, the controller divides a single progress bar into a plurality of parts to enable the single progress bar to play a role as a plurality of progress bars for a plurality of videos. This is described in detail with reference to FIG. 9 as follows.

FIG. 9 is a diagram illustrating an example of display screen configurations to describe that a first subimage is switched to a second subimage after a portion of a progress bar has been changed. Referring to FIG. 9, while a first video is output as a main image, a progress bar 910 and a first subimage 920 of a first video are output (FIG. 9(a)). In doing so, if the first subimage 920 is shifted to a second point from a first point along the progress bar 910 (FIG. 9(b)), the controller 180 can control the progress bar 910 to be partitioned into a first section 912 for the first video and a second section 914 for a second video (FIG. 9(c)). In this instance, the first section 912 may indicate a running time of the first video and the second section 914 may indicate a running time of the second video. Hence, the first subimage 920 of the second video can be displayed on the first section 912 and the second subimage 930 of the second video can be displayed on the second section 914.

When the progress bar 910 is divided into the first section 912 and the second section 914, the controller 180 controls the first subimage 920 to be switched to the second subimage 930 and can also control the second subimage 930 to be situated at an initial start point of the second section 914 (FIG. 9(c)). Yet, it is not necessary for an initial display position of the second subimage 930 to be the start point of the second section 914.

When the progress bar 910 is divided into the first section 912 and the second section 914, the controller 180 can control either the first subimage 920 or the second subimage 930 to be selectively displayed with reference to a boundary between the first section 912 and the second section 914. For instance, if the first subimage 920 displayed on the first section 912 is shifted to the second section 914 over the first section 912, the controller 180 can control the first subimage 920 to be switched to the second subimage 930. On the contrary, if the second subimage 930 displayed on the second section 914 is shifted to the first section 912 over the second section 914, the controller 180 can control the second subimage 930 to be switched to the first subimage 920.

In order to visually discriminate the first section 912 and the second section 914 with ease, the controller 180 can control the first section 912 and the second section 914 to be displayed by differing from each other in color or pattern. Although FIG. 9(c) shows one example that a length ratio (L1:L2) between the first section 912 and the second section 914 is 1:1, it is not mandatory for the length ratio between the first section 912 and the second section 914 to be 1:1. In particular, the controller 180 can control the length ratio between the first section 912 and the second section 914 to be determined in accordance with a ratio between a running time of the first video and a running time of the second video. For instance, if the running time of the first video is 1 hour and the running time of the second video is 30 minutes, the length ratio (L1:L2) between the first section 912 and the second section 914 may become 2:1.

In the examples shown in FIG. 9(a) and FIG. 9(b), as mentioned in the foregoing description with reference to FIG. 7, the second point of the progress bar 910 may be understood as including at least one of the end and start points of the progress bar 910. The first subimage 920 may be shifted to the end point of the progress bar 910. In addition, the first subimage 920 may be shifted to the start point of the progress bar 910. If the first subimage 920 is shifted to the end point of the progress bar 910, referring to FIG. 9(*b*), the controller 180 divides the progress bar 910 into the first section 912 and the second section 914 and also controls the second section 914 to play a role as a progress bar of the second video playable in order next to that of the first video. On the other hand, if the first subimage 920 is shifted to the start point of the progress bar 910, the controller 180 divides the progress bar 910 into the first section 912 and the second section 914 and also controls the second section 914 to play a role as a progress bar of the third video playable in order previous to that of the first video.

According to the description with reference to FIG. 9, only if the first subimage 920 is shifted to the second point of the progress bar 910, the progress bar 910 is divided into the first section 912 and the second section 914. Alternatively, even if the first subimage 920 is not shifted to the second point, the progress bar 910 may be divided into the first section 912 and the second section 914 through an appropriate touch gesture. For instance, referring to the example shown in FIG. 8, if an appropriate touch gesture is performed on the cue object neighboring to the progress bar 910, the controller 180 can control the progress bar 910 to be divided into the first section 912 and the second section 914.

According to the description with reference to FIG. 9, the progress bar 910 initially indicating the running time of the first video is divided into the two sections 912 and 914 indicating the running times of both of the first video and the second video in response to a user input. Unlike the example shown in the corresponding drawing, the controller 180 can control the progress bar 910 to be divided into the first section 912 and the second section 914 from the beginning irrespective of whether the first subimage 920 is shifted to the second point. In this instance, the controller 180 can omit the former processes described with reference to FIG. 9(*a*) and FIG. 9(*b*).

Figure 10:
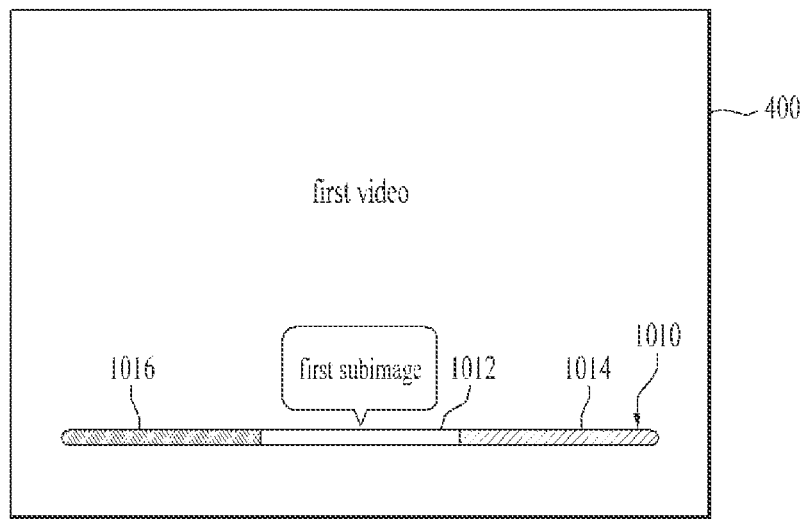
FIG. 10 is a diagram illustrating one example of a screen on which a progress bar is displayed by being separated into at least two sections.

The progress bar 910 may be divided into sections more than those shown in FIG. 9. For instance, FIG. 10 is a diagram illustrating one example of a screen on which a progress bar is displayed by being separated into at least two sections. FIG. 10 shows one example that a progress bar 1010 is displayed by being divided into 3 sections. In this instance, a first section 1012 of the progress bar 1010 may indicate a running time of a first video, a second section 1014 on the right side of the first section 1012 may indicate a running time of a second video playable in order next to that of the first video, and a third section 1016 on the left side of the first section 1012 may indicate a running time of a third video playable in order previous to that of the first video.

The controller 180 can control a switching between a first subimage and a third subimage to be performed before and after a boundary between the first section 1012 and the third section 1016. In addition, the controller 180 can control a switching between the first subimage and a second subimage to be performed before and after a boundary between a boundary between the first section 1012 and the second section 1014. In this instance, an n<sup>th</sup> subimage may include a playing image in a specific time of an n<sup>th</sup> video or a still image in the specific time of the n<sup>th</sup> video.

According to the former description with reference to FIG. 3, if an appropriate user input is input to the touchscreen 400, an output of a first subimage is ended and a second subimage is then displayed. According to the descriptions with reference to FIGS. 7 to 10, an output of a first subimage is ended and a second or third subimage is then output.

Yet, in the former embodiments, it is not necessary for either the first subimage or the second subimage to be selectively displayed. A mobile terminal according to one embodiment of the present invention can control a second subimage to be additionally displayed while displaying a first subimage. How to simultaneously display both of the first subimage and the second subimage is described in detail with reference to FIG. 11 as follows.

Figure 11:
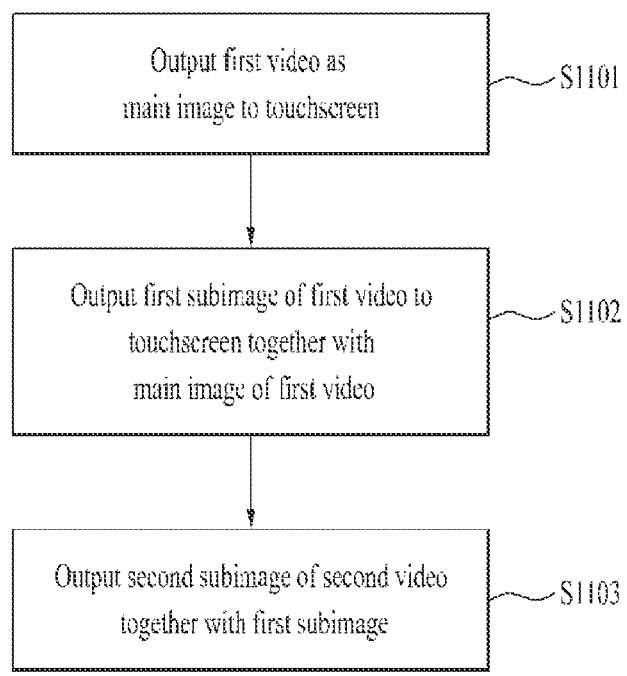
FIG. 11 is a flowchart illustrating a method of controlling a mobile terminal according to one embodiment of the present invention.

FIG. 11 is a flowchart for a method of controlling a mobile terminal according to one embodiment of the present invention. Steps S1101 and S1102 shown in FIG. 11 may correspond to the former steps S301 and S302 shown in FIG. 3, and their details is omitted from the following description. Referring to FIG. 11, while a first subimage is displayed, if an appropriate touch gesture is input to the touchscreen 400, the controller 180 can control the subimage of a first video and a second subimage of a second video to be simultaneously displayed on the touchscreen 400 (S1103).

For instance, the controller 180 displays a first progress bar for the first video and a second progress bar for the second video and may also control the first subimage and the second subimage to be displayed on the first progress bar and the second progress bar, respectively. Alternatively, the controller 180 divides a progress bar into a first section for the first video and a second section for the second video and may also control the first subimage and the second subimage to be displayed on the first section and the second section, respectively. In addition, corresponding details is described with reference to the accompanying drawing.

FIG. 12 is a diagram illustrating an example of display screen configurations to describe that both a first subimage and a second subimage are simultaneously displayed. Referring to FIG. 12, if there exists a playable order next or previous to that of a first video, the controller 180 can control cue objects 1206 and 1208 to be displayed to indicate that the next and previous playable orders exist, respectively (FIG. 12(*a*)). In this instance, details of the cue objects 1206 and 1208 may refer to the former description with reference to FIG. 8 and is omitted from the following description.

In doing so, the cue objects 1206 may be displayed by neighboring to a first progress bar 1202. If a touch gesture is performed on the cue object neighbor to a right side of an end point of the first progress bar 1202 among the cue objects situated at both ends of the first progress bar 1202 (e.g., the cue object is touched & dragged in left direction in FIG. 12(*a*)), the controller 180 can control a second progress bar 1212 indicating a running time of a second video to be displayed together with the first progress bar 1202 (FIG. 12(*b*)). When both of the first progress bar 1202 and the second progress bar 1212 are displayed, the controller 180 can control a first subimage 1204 of a first video and a second subimage 1214 of a second video playable in order next to that of the first video to be displayed.

FIG. 12(*a*) shows one example that the first subimage 1204 and the second subimage 1212 are displayed on the first progress bar 1202 and the second progress bar 1212 and indicate an output time of the first subimage 1204 and an output time of the second subimage 1212, respectively. In this instance, if a user shifts the first subimage 1204 along the first progress bar 1202, the controller 180 can control the first video in the specific time corresponding to the position, to which the first subimage 1204 has been shifted, to be output via the first subimage 1204. Likewise, if the user shifts the second subimage 1214 along the second progress bar 1212, the controller 180 can control the second video at the specific time corresponding to the position, to which the second subimage 1214 has been shifted, to be output via the second subimage 1214.

If a first subimage indicator and a second subimage indicator exist on the first progress bar 1202 and the second progress bar 1212 to indicate the output time of the first subimage 1204 and the output time of the second subimage 1214, respectively, the controller 180 can adjust the output time of the first subimage 1204 and the output time of the second subimage 1214 by adjusting a position of the first subimage indicator and a position of the second subimage indicator, respectively (not shown in the drawing).

Moreover, when the first subimage 1204 is shifted from a first point of the first progress bar 1202 to a second point of the first progress bar 1202, like the former example shown in FIG. 7, the second progress bar 1206 may be displayed (not shown in the drawing). Yet, unlike the former example shown in FIG. 7, the first subimage 1204 may be displayed together with the second subimage 1214 without disappearing.

In FIG. 12, a position of the first progress bar 1202 and a position of the second progress bar 1212 may be determined in accordance with a playable order of the first video and a playable order of the second video, respectively. For instance, when the second video has the playable order previous to that of the first video, the controller 180 can control the second progress bar 1212 to be situated above (or below) the first progress bar 1202. In another instance, when the second video has the playable order next to that of the first video, the controller 180 can control the second progress bar 1212 to be situated below (or above) the first progress bar 1202.

FIG. 12(*b*) shows one example that two progress bars are simultaneously displayed, by which the present invention is not limited. For instance, many progress bars more than two may be displayed. For instance, while both of the first progress bar 1202 of the first video and the second progress bar 1204 of the second video are displayed (FIG. 12(*b*)), if an appropriate touch gesture is performed on the cue object 1208 neighbor to a left side of a start point of the first progress bar 1202, the controller 180 can control a third progress bar 1222 to be further displayed to indicate a running time of a third video (FIG. 12(*c*)).

Moreover, the controller 180 can control a third subimage 1224 to be further displayed to display a play or still image in a specific time of the third video. Like the example shown in FIG. 12(*c*), when the third subimage 1224 is displayed above the third progress bar 1222, the controller 180 can control the third video corresponding to a specific time, which is indicated by the third subimage 1224, to be output as the third subimage 1224. In addition, the user can adjust an output time of the third subimage 1224 by shifting the third subimage 1224 along the third progress bar 1222.

FIG. 13 is a diagram illustrating another example of display screen configurations to describe that both a first subimage and a second subimage are simultaneously displayed. Referring to FIG. 13, a progress bar 1310 shown in FIG. 13(*a*) may initially indicate a running time of a first video output as a main image. While the first video is output as the main image, if there are a video playable in order next to that of the first video and a video playable in order previous to the first video, the controller 180 can control cue objects 1302 and 1304 to be displayed by neighboring to the progress bar 1310 (FIG. 13(*a*)).

If an appropriate touch gesture is performed on the cue object adjacent to an end point of the progress bar 1310 among the cue objects situated at both ends of the progress bar 1310 (e.g., the corresponding cue object is touched and dragged in left direction), the controller 180 can control the progress bar 1310 to be divided into a first section 1312 and a second section 1314. In this instance, the first section 1312 may indicate a running time of a first video and the second section 1314 may indicate a running time of a second video playable in order next to that of the first video.

When the progress bar 1310 is divided into the first section 1312 and the second section 1314, the controller 180 can control a first subimage 1320, which indicates a play or still image in a specific time of the first video, and a second subimage 1330, which indicates a play or still image in a specific time of the second video, to be displayed above the first section 1312 and the second section 1314, respectively.

As mentioned in the foregoing description of the example shown in FIG. 8, the first section 1312 and the second section 1314 may be discriminated from each other in different colors. In addition, a length ratio 1314 between the first section 1312 and the second section 1314 may be determined depending on a ratio of a running time of the first video and a running time of the second video.

If a touch gesture is performed on the cue object (e.g., the second cue object 1304) neighbor to a start point of the progress bar 1310 shown in FIG. 13(*a*), the controller 180 can control the first section 1312 and the second section 1314 of the progress bar 1310 to indicate a running time of the first video and a running time of a third video playable in order previous to that of the first video (not shown in the drawing). Simultaneously, a first subimage representing a play or still image in a specific time of the first video and a third subimage representing a play or still image in a specific time of the third video may be displayed on the first section 1312 and the second section 1314, respectively. As mentioned in the foregoing description of the example shown in FIG. 10, the progress bar 1310 shown in FIG. 13 may be divided into at least two sections.

Like the example shown in FIG. 9, when the first subimage 1320 is shifted to a second point of the progress bar 1310 from a first point of the progress bar 1310, it is a matter of course that the progress bar 1310 may be divided into a plurality of sections. Yet, unlike the former example shown in FIG. 9, the first subimage 1320 and the second subimage 1330 may be displayed on the first section 1312 and the second section 1314, respectively.

According to the descriptions with reference to FIG. 12 and FIG. 13, the first subimage is displayed above the first progress bar or the first section of the progress bar and the second subimage is displayed above the second progress bar or the second section of the progress bar. The mobile terminal according to one embodiment of the present invention may simultaneously display a first subimage and a second subimage on a single progress bar without dividing the single progress bar into at least two sections. How to display a first subimage and a first subimage using a single progress bar is described in detail with reference to FIG. 14 as follows.

FIG. 14 is a diagram illustrating an example of display screen configurations to describe that a first subimage and a second subimage are displayed using a single progress bar. Referring to FIG. 14, a progress bar 1410 may be configured to indicate both a running time of a first video and a running time of a second video. In particular, the progress bar 1410 may indicate the running time of the first video for a first subimage 1412 and may indicate the running time of the second video for a second subimage 1414. Hence, even if each of the first subimage 1412 and the second subimage 1414 is situated at the same point of the progress bar 1410, it makes a difference as follows. First of all, an image output via the first subimage 1412 is the first video at a specific time indicated by the first subimage 1410 and an image output via the second subimage 1414 is the second video at a specific time indicated by the second subimage 1410.

For instance, when the running time of the first video indicates 1 hour and the running time of the second video indicates 30 minutes, if each of the first subimage 1412 and the second subimage 1414 indicates the very center of the progress bar 1410, the output time corresponding to 30 minutes of the first video may be output via the first subimage 1412 and the output time corresponding to 15 minutes of the second video may be output via the second subimage 1414.

In order facilitate the first subimage 1412 and the second subimage 1414 to be discriminated from each other, the controller 180 can adjust display positions of the first subimage 1412 and the second subimage 1414, respectively. For instance, referring to FIG. 14(a), the controller 180 can control the first subimage 1410 to be displayed above the progress bar 1410 and also controls the second subimage 1412 to be displayed below the progress bar 1410, with reference to the progress bar 1410. On the contrary to the example shown in FIG. 14(a), the first subimage 1412 may be displayed below the progress bar 1410 and the second subimage 1412 may be displayed above the progress bar 1410.

In another instance, referring to FIG. 14(b), the controller 180 can control a display position of the second subimage 1414 to be situated further above the position of displaying the first subimage 1412. Unlike the example shown in FIG. 14(b), the display position of the first subimage 1412 may be situated further above the position of displaying the second subimage 1414.

According to the examples described with reference to FIG. 14(a) and FIG. 14(b), by adjusting the display positions of the first subimage 1412 and the second subimage 1414, the controller 180 can prevent the first subimage 1412 and the second subimage 1414 from overlapping with each other.

When the first subimage 1412 and the second subimage 1414 include a playing image of the first video and a playing image of the second video, respectively, moving speeds of the first subimage 1412 and the second subimage 1414 may vary in accordance with running times of the first and second videos, respectively. For instance, when the running time of the first video and the running time of the second video include 1 hour and 30 minutes, respectively, if each of the first subimage 1412 and the second subimage 1414 is played back for 15 minutes, a shifted distance of the first subimage 1412 is ¼ of the progress bar 1410 but a shifted distance of the second subimage 1414 along the progress bar may amount to ½ of the progress bar 1410. In particular, a length of 'd2' may correspond to '2d1' (FIG. 14(c)).

The controller 180 of the mobile terminal according to another embodiment of the present invention can adjust play speeds of the first subimage 1412 and the second subimage 1414 to enable the first subimage 1412 and the second subimage 1414 to have the same moving speed. In this instance, according to the above-mentioned example, the play speed of the first subimage 1412 may become twice faster than that of the second subimage 1414. In particular, while images amounting to 15 minutes are played back via the first subimage 1412, the controller 180 controls images amounting to 15 minutes to be played back via the second subimage 1414, thereby controlling each of the shifted distances of the $1^{st}$ subimage 1412 and the $2^{nd}$ subimage 1414 to equally become ½ of the progress bar 1410.

According to the above-mentioned embodiments, if an appropriate touch gesture is input to a prescribed one of the first subimage and the second subimage, the controller 180 can control the corresponding subimage to be displayed by being converted to a main image. This is described in detail with reference to FIG. 15 as follows.

FIG. 15 is a diagram illustrating an example of display screen configurations to describe that a first subimage or a second subimage is output by being converted to a main image. Referring to FIG. 15, assume that a time A-1 of a first video is output as a main image and that a time A-2 of the first video is output as a first subimage 1510 (FIG. 15(a)). In doing so, if a touch gesture is performed on the first subimage 1510, the controller 180 can control the time A-2 of the first video to be displayed as a main image on the touchscreen 400 (FIG. 15(b)). When the first subimage is output by being converted to the main image, the controller 180 may end the output of the first subimage 1510 and the output of the progress bar (FIG. 15(b)).

If in the example shown in FIG. 15(b), if a touch gesture is performed on the second subimage 1520 for outputting a time B-1 of a second video, referring to FIG. 15(c), the controller 180 can control the time B-1 of the second video to be output by being converted to a main image.

In particular, when an appropriate touch gesture is performed on one of the first subimage and the second subimage, the controller 180 can control the user-selected subimage to be displayed on the touchscreen 400 by being converted to the main image.

Moreover, according to the above-mentioned embodiments, a display size of the first subimage or a display size of the second subimage may be adjusted in accordance with a user's appropriate touch gesture. According to the above-mentioned embodiments, a first subimage is a playing or still image in a specific time of a first video and a second subimage is a playing or still image in a specific time of a second video.

When the first subimage and the second subimage include the playing image of the first video and the playing image of the first video, respectively, the first subimage and the second subimage may be shifted along a first progress bar and a second progress bar or a first section and a second section of a progress bar, respectively. In doing so, a play speed of each of the first and second subimages may be set faster than that of a main image. If the play speed of each of the first and second subimages is set faster than that of the main image, a user can quickly search contents of the first and second videos via the first and second subimages, respectively.

Figure 16:
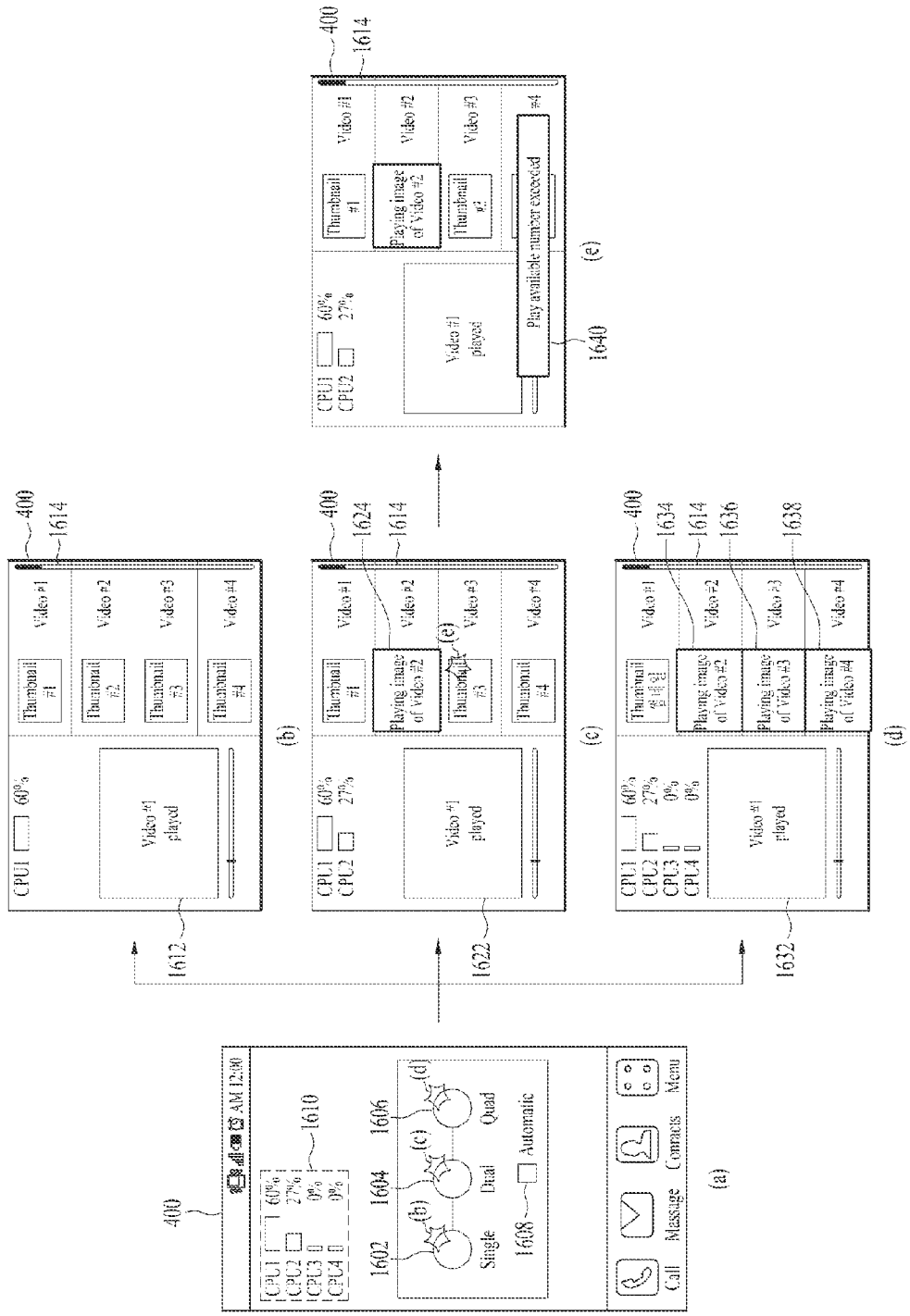
FIG. 16 is a diagram illustrating display screen configurations to describe that the number of playing images displayed on a touchscreen is adjusted depending on the number of active cores when a controller includes maximum 4 cores (e.g., quad-core processor)

If the controller 180 includes a multi-core processor, the controller 180 can control the number of playing images, which are output via the touchscreen 400, to be adjusted in accordance with performance of the multi-core processor. This is described in detail with reference to FIG. 16 as follows. FIG. 16 is a diagram illustrating an example of display screen configurations to describe that the number of playing images displayed on a touchscreen is adjusted depending on the number of active cores when a controller includes maximum 4 cores (e.g., quad-core processor).

Referring to FIG. 16, like the former example shown in FIG. 5, the touchscreen 400 is partitioned into a first region and a second region. A first video is displayed via the first region. In addition, a playable video list is displayed via the second region. When the controller 180 includes 4 cores, a user can select the number of the cores to activate.

FIG. 16(*a*) shows one example of a screen provided to a user to select the number of cores to activate. In FIG. 16(*a*), a 'single' button 1602 is provided to set a single core to be activated and a 'dual' button 1604 is provided to set 2 cores to be activated. In addition, a 'quad' button 1606 is provided to set all the 4 cores to be activated. The controller 180 can control at least one of the cores to enter an activate state in response to a user's input. If an 'automatic' button 1608 is selected (FIG. 16(*a*)), the controller 180 can automatically determine the number of cores to activate. In doing so, the controller 180 can automatically determine the number of cores to activate based on a job load on each core, a remaining power level of the power supply unit 190, the number of active applications and the like.

Moreover, the controller 180 can control a workload indicator 1610, which indicates a work amount of each of the cores via the touchscreen 400, to be displayed on the touchscreen 400. In the example shown in FIG. 16(*a*), the controller 180 can control work amounts of 4 cores to be indicated by 4 workload indicators 1610, respectively. A user can check the work amount of each of the cores via the corresponding workload indicator 1610 and can then determine the number of cores to activate.

If one processor is selected to be activated (FIG. 16(*a*)), a playing image output via the touchscreen 400 may include a single #1 video 1612 displayed on the #1 screen (FIG. 16(*b*)). If the user sets two cores to be activated or two cores are automatically activated (FIG. 16(*a*)), the controller 180 may limit the number of playing images, which are output via the touchscreen 400, to 2. In this instance, referring to FIG. 16(*c*), the #1 video is played via the first region and a prescribed video displayed on a playable video list may be preview-played via the second region (e.g., the #2 video is preview-played (1624) in FIG. 16(*c*)).

When 4 cores are selected to be activated, the controller 180 may limit the number of playing images, which are output via the touchscreen 400, to 4. In this instance, referring to FIG. 16(*d*), the #1 video 1632 is played via the first region and maximum 3 videos can be preview-played via the second region. In FIG. 16(*d*), videos #2 to #4 are preview-played (1634, 1636, 1638) via the second region.

In the examples shown in FIGS. 16(*b*) to 16(*d*), if a user intends to play more videos of which number exceeds a threshold (e.g., a thumbnail #3 is touched in FIG. 16(*c*)), the controller 180 can control a toast message 1640, which indicates that the play available number is exceeded, to be output via the touchscreen 400 (FIG. 16(*e*)).

The example shown in FIG. 16 is not limited to a main image and a preview screen. Moreover, the example shown in FIG. 16 may be exactly applicable to first and second subimages output when outputting a first video as a main image. For instance, when only one processor is activated (single core), the controller 180 plays the first video as the main image via the touchscreen 400 and also controls the first and second subimages to be displayed as still images, thereby controlling the number of the maximum playable image to be adjusted into 1.

When two processors are activated (dual core), the controller 180 can control maximum 1 subimage (or 2 preview images) to be displayed as a playing image separate from the main image on the touchscreen 400. When four processors are activated (quad core), the controller 180 can control maximum 3 subimages to be displayed as playing images separate from the main image on the touchscreen 400.

In particular, the controller 180 of the present invention can control more playing images to be displayed via the touchscreen 400 in proportion to the number of the active cores. Thus, the threshold is put on the number of playing images displayed on the touchscreen 400, whereby a main image can be smoothly played in any case by preventing a processor from being overloaded.

In the example shown in FIG. 16, as the active core number is incremented by 1, the playable video number is incremented by 1 as well. Hence, the number of playable videos increases linearly in proportion to the number of active cores. This is just to describe that more videos can be played in proportion to the number of active processors. Unlike the example shown in FIG. 16, the active core number and the playable video number may be determined in a different manner.

Moreover, the controller 180 can determine the maximum number of playable videos based on resolution of a video file, codec of a video file and the like. Theses enumerated items are indexes related to the core share. In addition, the controller 180 can determine the maximum playable video number within a range that does not exceed a preset level. Moreover, if the share of each processor exceeds a preset limit, the controller 180 can control an inactive core to be automatically activated.

According to the embodiments mentioned in the above description, when a subimage is a playing image, a play speed of a main image or the subimage may have a preset fixed value or may be adjusted by an appropriate user input. This is described with reference to FIG. 17 as follows.

Figure 17:
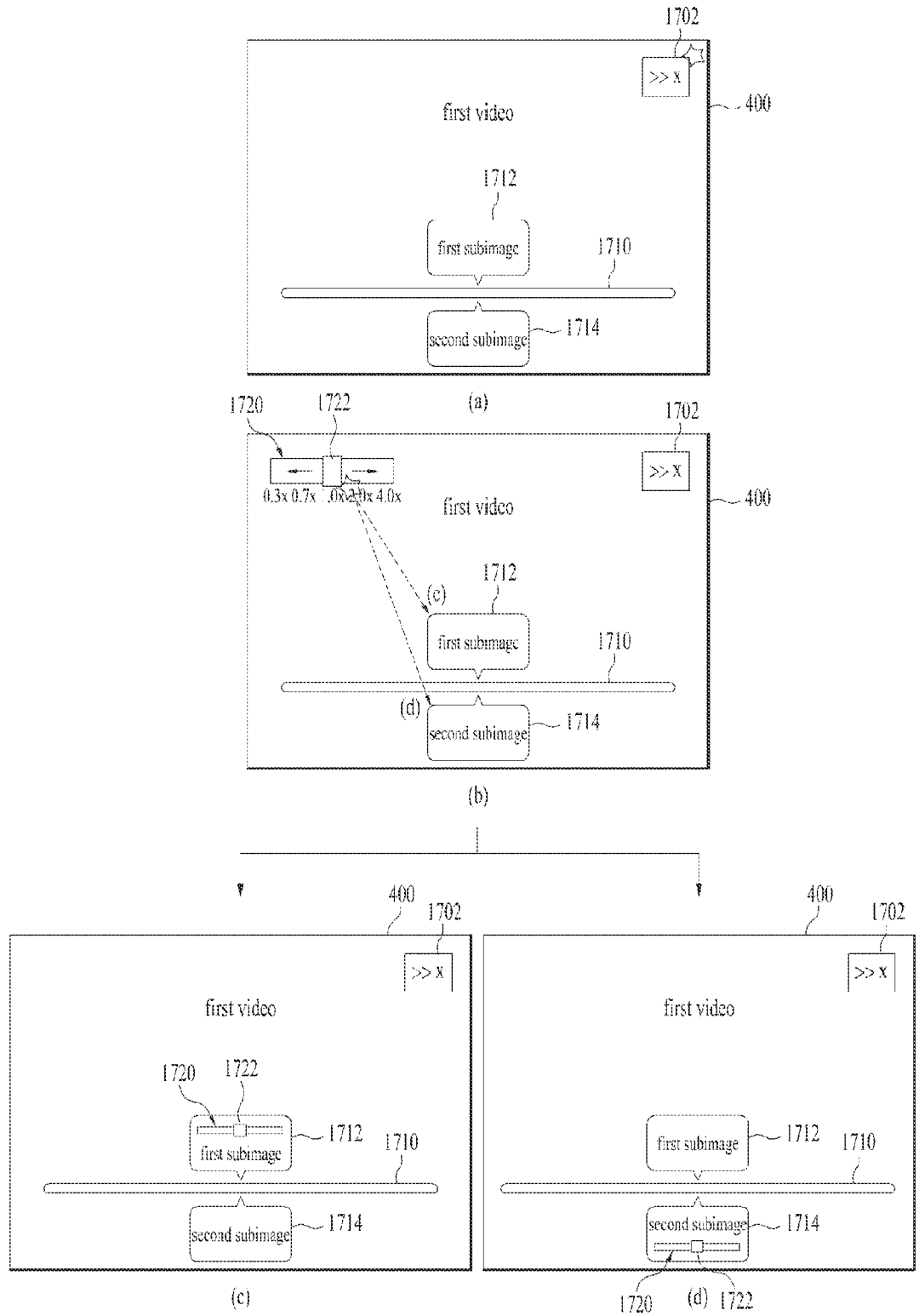
FIG. 17 is a diagram illustrating display screen configurations provided to set up a play speed of a main image and a play speed of a subimage.

FIG. 17 is a diagram illustrating an example of display screen configurations provided to set up a play speed of a main image and a play speed of a subimage. Referring to FIG. 17, if an x-speed play icon 1702 shown in FIG. 17(*a*) is touched, the controller 180 can control a play speed control bar 1720 for adjusting a play speed of a main image to be displayed on the touchscreen 400. A play speed indicator 1722 is displayed on the play speed control bar 1720. In addition, the play speed indicator 1722 can indicate a play speed of a first video output as a main image.

A user adjusts the play speed indicator 1722 along the play speed control bar 1720, thereby controlling the play speed of the first video output as the main image to be adjusted. While the play speed control bar 1720 is displayed via the touchscreen 400, if the x-speed play icon 1720 is touched again, the controller 180 can control the play speed control bar 1720 to disappear.

In doing so, the play speed control bar 1720 may be shifted to a first subimage or a second subimage in response to an appropriate touch input (e.g., shifted by a touch & drag in FIG. 17(*b*)). The controller 180 may determine to adjust a play speed of one of the main image, the $1^{st}$ subimage and the $2^{nd}$ subimage in accordance with a position of the play speed control bar 1720. For instance, referring to FIG. 17(*c*), if the play speed control bar 1720 is shifted onto the $1^{st}$ subimage 1712, the play speed indicator 1722 of the play speed control bar 1720 may indicate a play speed of the $1^{st}$ subimage 1712. The user shifts the play speed indicator 1722 along the play speed control bar 1720 displayed on the $1^{st}$ subimage 1712, thereby controlling the play speed of the $1^{st}$subimage 1712 to be adjusted.

Once the play speed control bar 1720 is shifted onto the second subimage 1714 (FIG. 17(*d*)), the user can adjust the play speed of the second subimage 1714 via the play speed control bar 1720 and the play speed indicator 1722. In particular, the controller 180 can adjust the play speeds of the main image, the first subimage 1712 and the second subimage 1714. In doing so, the controller 180 can control a playing image, of which play speed will be adjusted, to be determined in accordance with a position of an object (e.g., the play speed control bar 1720 in FIG. 17) for adjusting the play speed.

In the above-mentioned embodiments, when a subimage is a playing image, whether to grant an audio output authority to a main image or a subimage may be determined by an appropriate user input. In particular, the controller 180 can determine whether to output a sound of a playing image of the main image or the subimage in accordance with a position of an audio object.

Figure 18:
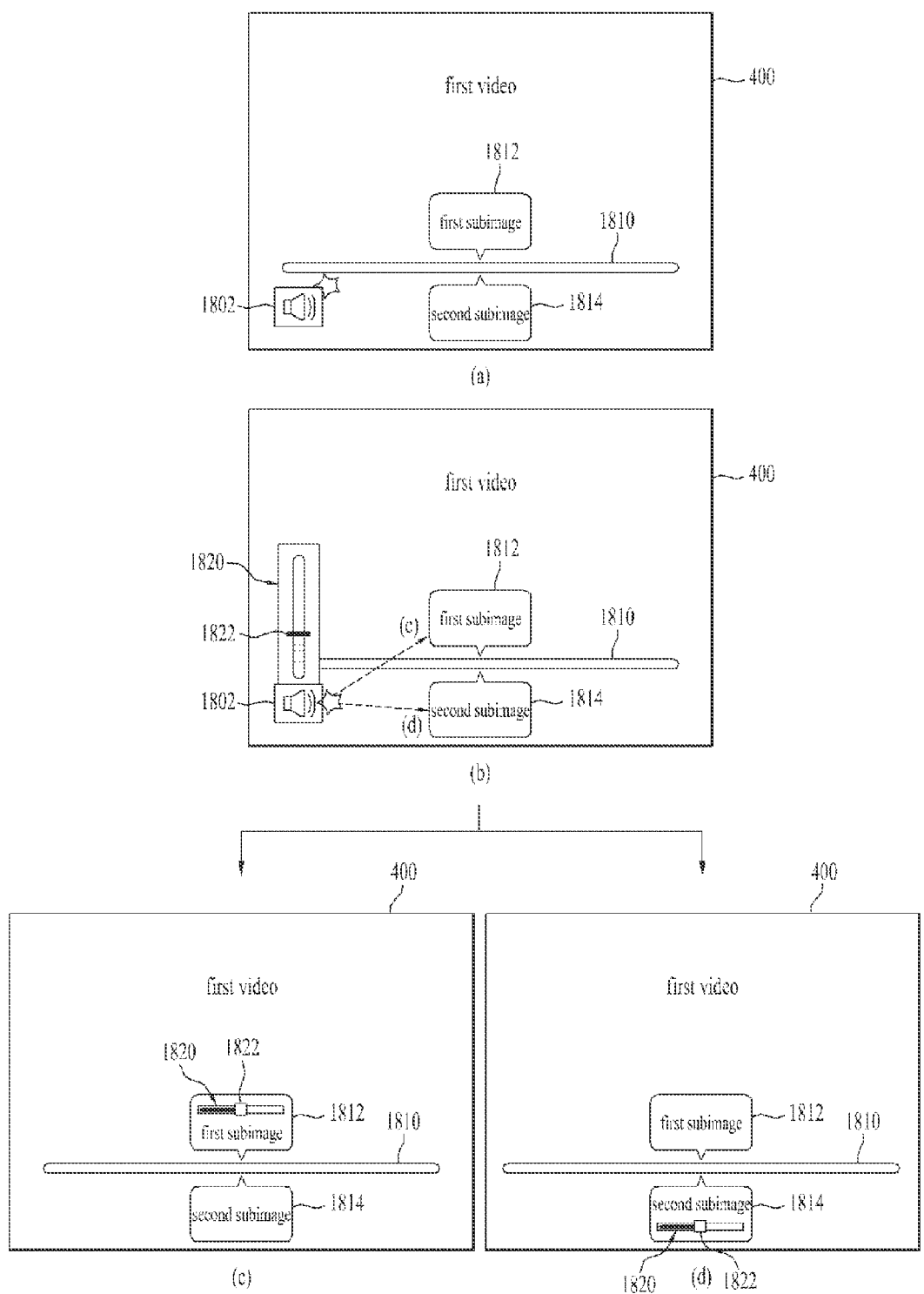
FIG. 18 is a diagram illustrating display screen configurations provided to grant an audio output authority to either a main image or a subimage.

FIG. 18 is a diagram illustrating an example of display screen configurations provided to grant an audio output authority to either a main image or a subimage. Referring to FIG. 18, if a volume icon 1802 shown in FIG. 18(*a*) is touched, the controller 180 can control a volume adjust bar 1820 to be displayed on the touchscreen 400 to adjust a sound output via a main image. In doing so, a volume indicator 1822 is displayed on the volume adjust bar 1820. In addition, the volume indicator 1822 may indicate an audio output level of a first video output as the main image. The controller 180 can control the audio output level, which is output via the main image, to be adjusted in accordance with a position of the volume indicator 1822 on the volume adjust bar 1820.

In doing so, the volume adjust bar 1820 may be shifted to a first subimage 1812 or a second subimage 1814 via an appropriate touch input. The controller 180 can determine whether to grant an audio output authority to a playing image of the main image, the first subimage or the second subimage. For instance, referring to FIG. 18(*c*), if the volume adjust bar 1820 is shifted onto the first subimage 1812, the controller 180 can control the audio output authority granted to the main image to be shifted to the first subimage 1812. Hence, the audio of the playing image output via the first subimage 1812 may be output via the audio output module 152. In another instance, referring to FIG. 18(*d*), if the volume adjust bar 1820 is shifted onto the second subimage 1814, the controller 180 can control the audio output authority to be granted to the second subimage 1814. Hence, the audio of the playing image output via the $2^{nd}$ subimage 1814 may be output via the audio output module 152.

In particular, the controller 180 can determine whether to grant the audio output authority to which one of a plurality of playing images in accordance with a position of an audio object (e.g., the volume adjust bar 1820 in FIG. 18).

The embodiments described with reference to FIG. 4 and FIG. 11 may be implemented separately or may be implemented together by a single mobile terminal. For instance, the controller 180 can selectively perform either the step S403 shown in FIG. 4 or the step S1103 shown in FIG. 11 depending on a setup value of the mobile terminal or whether a plurality of subimages are set to be simultaneously displayed. In another instance, while a first subimage is output, if a first touch gesture is input, the controller 180 can control the step S403 shown in FIG. 4 to be performed. While the first subimage is output, if a second touch gesture is input, the controller 180 can control the step S1103 shown in FIG. 11 to be performed.

In FIGS. 8 to 12, if there is a video playable in order next or previous to that of a first video, cue objects can be displayed. If there is no video playable in order next or previous to that of a first video, the controller 180 can omit the cue objects.

In doing so, if there is no video playable in order next or previous to that of a first video, the controller 180 can control a guide message, which is provided to lead a download of a video file determined as a series of the first video, to be displayed. For instance, when a first video corresponds to a volume #1 of a series drama, the controller 180 can control a guide message, which is provided to download a volume #2 of the series drama, to be displayed. If an appropriate touch gesture is input to the guide message, the controller 180 can download the volume #2 of the series drama. Moreover, while the $1^{st}$ video is output as a main image, the controller 180 can control the volume #2 of the series drama, which is being downloaded, to be output as a subimage.

According to the embodiments of the present invention described with reference to FIG. 3 and FIG. 11, after a first subimage of a first video has been output, a second subimage may be output together with or instead of the first subimage. According to another embodiment of the present invention, either the step S302/S1102 of outputting a first subimage or the step S303/S1103 of outputting a second subimage may be skipped to implement the present invention.

Accordingly, embodiments of the present invention provide various effects and/or features. First of all, user's convenience in using a mobile terminal can be enhanced. Secondly, while a first video is output, a user can search contents of a second video different from the first video as well as contents of the first video.

In addition, the above-described image display methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalent.

What is claimed is:

1. A mobile terminal, comprising:
   a touchscreen; and
   a controller configured to:
   display a playing image of a first video as a main image in a first region of the touchscreen,
   display a video list in a second region of the touchscreen different than the first region while the playing image of the first video is displayed in the first region, the video list comprising a first thumbnail image representing the first video and a second thumbnail image representing a second video,
   display a playing image of the second video in a first size as a preview image in the second region in a sub playing window while the playing image of the first video is displayed in the first region, in response to a first proximity touch input to the second thumbnail image, wherein the playing image of the first video in the first region and the playing image of the second video in the sub playing window in the second region are concurrently displayed in response to the first proximity touch input to the second thumbnail image,
   display the playing image of the second video in a second size larger than the first size, in response to a first contact touch input to the second thumbnail image, and display a first progress bar for the first video and a second progress bar for the second video while the first image is played back as the main image, wherein a first sub image of the first video is displayed with respect to the first progress bar and a second sub image of the second video is displayed with respect to the second progress bar, and wherein the first progress bar for the first video, the first sub image of the first video, the second progress bar for the second video, and the second sub image of the second video are concurrently displayed while the first image is played back as the main image.

2. The mobile terminal of claim 1, wherein the sub playing window has a larger display size than the second thumbnail image.

3. The mobile terminal of claim 1, wherein in response to the first proximity touch input to the second thumbnail image in the video list while the playing image of the first video is displayed in the first region, the controller is further configured not to display the playing image of the second video in the first region.

4. The mobile terminal of claim 3, wherein the controller is further configured to determine whether to additionally play another video with the first and second videos according to a number of activated processing cores.

5. The mobile terminal of claim 1, wherein the controller is further configured to display the playing image of the second video in full screen on the touchscreen in response to the first contact touch input to the second thumbnail image.

6. The mobile terminal of claim 1, wherein the controller is further configured to overlay the preview image of the second video on the video list in the second region.

7. The mobile terminal of claim 1, wherein the controller is configured to display the playing image of the second video as the main image substituting for the playing image of the first video in response to the first contact touch input to the second thumbnail image.

8. The mobile terminal of claim 1, wherein the controller is further configured to:
display the progress bar indicating the progress status of the first video while the playing image of the first video is displayed as the main image,
display a playing image of a first portion of the first video corresponding to a first point of the progress bar as the main image in response to a second contact touch input to the first point of the progress bar, and
display a playing image of a second portion of the first video corresponding to a second point of the progress bar as the preview image while the playing image of the first portion of the first video is displayed as the main image, in response to a second proximity touch input to the second point of the progress bar.

9. The mobile terminal of claim 1, wherein the controller is further configured to display the first thumbnail image representing the first video in the second region while the playing image of the first video is displayed in the first region.

10. A method of controlling a mobile terminal, the method comprising:
displaying a playing image of a first video as a main image in a first region of a touchscreen of the mobile terminal;
displaying a video list in a second region of the touchscreen different than the first region while the playing image of the first video is displayed in the first region, the video list comprising a first thumbnail image representing the first video and a second thumbnail image representing a second video;
displaying a playing image of the second video in a first size as a preview image in the second region in a sub playing window while the playing image of the first video is displayed in the first region, in response to a first proximity touch input to the second thumbnail image, wherein the playing image of the first video in the first region and the playing image of the second video in the sub playing window in the second region are concurrently displayed in response to the first proximity touch input to the second thumbnail image;
displaying the playing image of the second video in a second size larger than the first size, in response to a first contact touch input to the second thumbnail image;
simultaneously displaying the playing image of the first video in the first region and the playing image of the second video in the sub playing window in the second region in response to the first proximity touch input to the second thumbnail image; and
displaying a first progress bar for the first video and a second progress bar for the second video while the first image is played back as the main image, wherein a first sub image of the first video is displayed with respect to the first progress bar and a second sub image of the second video is displayed with respect to the second progress bar, and wherein the first progress bar for the first video, the first sub image of the first video, the second progress bar for the second video, and the second sub image of the second video are concurrently displayed while the first image is played back as the main image.

11. The method of claim 10, wherein the sub playing window has a larger display size than the second thumbnail image.

12. The method of claim 10, wherein in response to the first proximity touch input to the second thumbnail image in the video list while the playing image of the first video is displayed in the first region, the method further comprises not displaying the playing image of the second video in the first region.

13. The method of claim 12, further comprising:
determining whether to additionally play another video with the first and second videos according to a number of activated processing cores.

* * * * *